United States Patent
Wen

(10) Patent No.: US 10,468,052 B2
(45) Date of Patent: Nov. 5, 2019

(54) METHOD AND DEVICE FOR PROVIDING INFORMATION

(71) Applicant: SAMSUNG ELECTRONICS CO., LTD., Suwon-si (KR)

(72) Inventor: Xue Wen, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 15/044,467

(22) Filed: Feb. 16, 2016

(65) Prior Publication Data

US 2016/0240213 A1 Aug. 18, 2016

(30) Foreign Application Priority Data

Feb. 16, 2015 (CN) .......................... 2015 1 0084928
Dec. 4, 2015 (KR) ........................ 10-2015-0172647

(51) Int. Cl.
*G10L 25/63* (2013.01)
*G10L 13/027* (2013.01)
*G10L 15/08* (2006.01)

(52) U.S. Cl.
CPC ............ *G10L 25/63* (2013.01); *G10L 13/027* (2013.01); *G10L 2015/088* (2013.01)

(58) Field of Classification Search
CPC ...................................................... G10L 25/63
See application file for complete search history.

(56) References Cited

U.S. PATENT DOCUMENTS

| 6,721,704 B1* | 4/2004 | Strubbe ................... G10L 25/48 379/88.01 |
| 6,731,307 B1 | 5/2004 | Strubbe et al. |
| 6,757,362 B1 | 6/2004 | Cooper et al. |
| 6,842,767 B1* | 1/2005 | Partovi .................. G06Q 30/06 709/203 |
| 7,881,934 B2* | 2/2011 | Endo ....................... G10L 15/22 704/251 |

(Continued)

FOREIGN PATENT DOCUMENTS

| CA | 2791791 A1 | 7/2011 |
| CN | 103543979 A | 1/2014 |

(Continued)

OTHER PUBLICATIONS

Communication dated May 23, 2016, issued by the International Searching Authority in counterpart International Application No. PCT/KR2016/001488.

(Continued)

*Primary Examiner* — Matthew H Baker
(74) *Attorney, Agent, or Firm* — Sughrue Mion, PLLC

(57) ABSTRACT

A method and a device for providing information are provided. The method includes obtaining, via a communication terminal, speech information provided by at least one participant in a communication conducted using the communication terminal via the communication terminal; obtaining state information indicating a current state of the at least one participant by using at least one from among the speech information and data stored in advance; determining a virtual speech to be provided to the at least one participant based on the speech information and the state information; and outputting the determined virtual speech.

24 Claims, 12 Drawing Sheets

(56) References Cited

U.S. PATENT DOCUMENTS

| | | | |
|---|---|---|---|
| 8,107,401 B2 | 1/2012 | John et al. | |
| 8,131,551 B1 | 3/2012 | Cosatto et al. | |
| 8,326,998 B2 | 12/2012 | Schultz et al. | |
| 8,386,261 B2 | 2/2013 | Mellott et al. | |
| 8,495,507 B2* | 7/2013 | Schneider | G06Q 10/107 715/752 |
| 8,649,776 B2 | 2/2014 | Tofighbakhsh et al. | |
| 8,880,629 B1* | 11/2014 | Henrick | A63F 13/00 709/206 |
| 8,983,845 B1* | 3/2015 | Kristjansson | G10L 21/00 381/58 |
| 9,224,260 B2* | 12/2015 | Acres | G07F 17/323 |
| 9,390,706 B2* | 7/2016 | Gustafson | G10L 15/265 |
| 9,853,824 B2* | 12/2017 | Zimmet | G06Q 10/103 |
| 9,865,280 B2* | 1/2018 | Sumner | G10L 25/48 |
| 2002/0103647 A1* | 8/2002 | Houplain | G10L 15/26 704/260 |
| 2003/0167167 A1* | 9/2003 | Gong | G10L 17/26 704/250 |
| 2006/0203992 A1* | 9/2006 | Kim | G10L 17/26 379/265.06 |
| 2007/0043687 A1 | 2/2007 | Bodart et al. | |
| 2008/0268953 A1* | 10/2008 | Acres | G07F 17/32 463/31 |
| 2009/0265167 A1* | 10/2009 | Ehara | G10L 19/265 704/219 |
| 2010/0106500 A1* | 4/2010 | McKee | G10L 15/26 704/235 |
| 2010/0121808 A1* | 5/2010 | Kuhn | G06N 99/005 706/50 |
| 2010/0169418 A1* | 7/2010 | Whynot | H04W 4/02 709/204 |
| 2010/0274796 A1* | 10/2010 | Beauregard | H04L 12/1822 707/769 |
| 2010/0278318 A1* | 11/2010 | Flockhart | G10L 17/26 379/88.04 |
| 2011/0047246 A1* | 2/2011 | Frissora | G06F 9/543 709/219 |
| 2011/0107236 A1 | 5/2011 | Sambhar | |
| 2012/0088209 A1 | 4/2012 | Poole et al. | |
| 2012/0179717 A1* | 7/2012 | Kennedy | G06F 16/9535 707/772 |
| 2012/0254944 A1 | 9/2012 | Gruber et al. | |
| 2012/0253788 A1* | 10/2012 | Heck | G06F 17/279 704/9 |
| 2013/0007635 A1* | 1/2013 | Michaelis | H04M 3/56 715/753 |
| 2013/0152092 A1 | 6/2013 | Yadgar | |
| 2013/0174034 A1 | 7/2013 | Brown et al. | |
| 2013/0194278 A1 | 8/2013 | Zajac, III | |
| 2013/0305169 A1* | 11/2013 | Gold | G09B 5/00 715/757 |
| 2013/0346886 A1 | 12/2013 | Cauchois et al. | |
| 2014/0004486 A1* | 1/2014 | Crawford | G09B 5/00 434/185 |
| 2014/0025383 A1 | 1/2014 | Dai et al. | |
| 2014/0080590 A1* | 3/2014 | Link | G07F 17/3255 463/27 |
| 2014/0082100 A1 | 3/2014 | Sammon et al. | |
| 2014/0316767 A1* | 10/2014 | Fitterer | G06F 17/2775 704/9 |
| 2014/0324749 A1* | 10/2014 | Peters | G09B 7/04 706/46 |
| 2014/0329507 A1* | 11/2014 | Siminoff | H04M 3/00 455/414.1 |
| 2014/0356822 A1 | 12/2014 | Hoque et al. | |
| 2015/0012463 A1* | 1/2015 | Rosenthal | G10L 25/63 706/11 |
| 2015/0081802 A1* | 3/2015 | Borenstein | H04L 51/04 709/206 |
| 2015/0186154 A1* | 7/2015 | Brown | G06F 3/04817 715/706 |
| 2015/0207765 A1* | 7/2015 | Brantingham | H04L 51/046 715/758 |
| 2015/0302301 A1* | 10/2015 | Petersen | G06N 5/04 706/11 |
| 2015/0317977 A1* | 11/2015 | Manjunath | G10L 17/00 704/270 |
| 2016/0196836 A1* | 7/2016 | Yu | H04M 1/72519 704/207 |
| 2016/0210115 A1* | 7/2016 | Lee | G06F 3/167 |

FOREIGN PATENT DOCUMENTS

| | | |
|---|---|---|
| EP | 2690847 A1 | 1/2014 |
| JP | 3920175 B2 | 5/2007 |
| WO | 02/019178 A2 | 3/2002 |
| WO | 2007/067528 A2 | 6/2007 |
| WO | 2008/049834 A2 | 5/2008 |
| WO | 2012/164534 A1 | 12/2012 |

OTHER PUBLICATIONS

Office Action dated Jan. 2, 2019 by the State Intellectual Property Office of p.R. China in counterpart Chinese Patent Application No. 201510084928.7.

Office Action dated Feb. 22, 2019 by the European Patent Office in counterpart European Patent Application No. 16752649.0.

Communication dated Apr. 4, 2018, issued by the State Intellectual Property Office in counterpart Chinese application No. 201510084928.7.

Communication dated Feb. 8, 2018, issued by the European Patent Office in counterpart European application No. 16752649.0.

* cited by examiner

METHOD AND DEVICE FOR PROVIDING INFORMATION

CROSS-REFERENCE TO RELATED APPLICATIONS

This application claims priority from Chinese Patent Application No. 201510084928.7, filed on Feb. 16, 2015, in State Intellectual Property Office (SIPO) of the People's Republic of China and Korean Patent Application No. 10-2015-0172647, filed on Dec. 4, 2015, in the Korean Intellectual Property Office, the disclosures of which are incorporated herein in their entirety by reference.

BACKGROUND

1. Field

Methods and apparatuses consistent with exemplary embodiments relate to methods and devices for providing information, and more particularly, to methods and devices for providing speech information.

2. Description of the Related Art

Due to developments in electronic technologies, remote calls are commonly made using a smart phone, a personal computer (PC), or a tablet computer. Furthermore, a remote call is generally performed between two people. Conversations are generally conducted via voice during remote calls.

Furthermore, in relation to voice recognition techniques, a method of receiving an input of a voice of a user, analyzing the received voice of the user, and generating an output corresponding to the received voice of the user is being used.

In detail, the speech recognition technique enables a computer to analyze and recognize or comprehend an acoustic speech signal, such as a voice articulated by a human, where the articulated voice is recognized by transforming it to an electric signal and extracting the frequency characteristics of an acoustic signal corresponding to the articulated voice therefrom.

As computers are widely used and the number of computer users increase, computers are widely utilized in daily life. Due to recent developments in computer-related technologies, various techniques using computers are being developed. Furthermore, voice recognition techniques using computers are being used in various fields.

SUMMARY

Provided are methods and devices for providing speech information.

Additional aspects will be set forth in part in the description which follows and, in part, will be apparent from the description, or may be learned by practice of the presented exemplary embodiments.

According to an aspect of an exemplary embodiment, a method of providing information is provided, the method includes obtaining, via a communication terminal, speech information provided by at least one participant in a communication by using a communication terminal via the communication terminal; obtaining state information indicating a current state of the at least one participant by using at least one from among the speech information and data stored in advance; determining a virtual speech to be provided to the at least one participant based on the speech information and the state information; and outputting the determined virtual speech.

Furthermore, the obtaining of the speech information via the communication terminal may include outputting an inquiring virtual speech for obtaining information regarding the at least one participant; and obtaining the speech information including additional speech information obtained in response to the inquiring virtual speech that was output.

Furthermore, the state information according to an exemplary embodiment may include at least one from among emotion information indicating a current emotion state of at least one participant, personal information related to the at least one participant, topic information related to a current topic of a conversation, schedule information related to the at least one participant, and personality information related to the at least one participant.

Furthermore, the speech information may include voice information related to the at least one participant obtained by the communication terminal.

Furthermore, the determining the virtual speech may include obtaining content of the virtual speech by using the speech information; determining an expression style of the virtual speech by using the state information; and obtaining or generating the virtual speech in which the obtained content is expressed in the determined expression style.

Furthermore, the determining the virtual speech may include determining whether the speech information may include a pre-set keyword; and upon a condition that the speech information includes the pre-set keyword, obtaining or generating the virtual speech including content related to a topic different from the topic of the conversation.

Furthermore, the state information may include emotion information related to the at least one participant, and, in the determining of the virtual speech, the virtual speech corresponding to content and an expression style determined based on the emotion information may be obtained.

Furthermore, the emotion information may include information related to types of emotions and information related to levels of emotions.

Furthermore, the determining of the virtual speech may include determining whether the emotion state of the at least one participant is abnormal by using the emotion information; and, upon a condition that it is determined that the emotion state of the at least one participant is abnormal, obtaining the virtual speech including content related to a topic different from the topic of the conversation.

Furthermore, in the determining of whether the emotion state is abnormal, it may be determined whether the emotion state of the at least one participant is abnormal based on a type of the emotion of the at least one participant and a duration of the emotion of the corresponding type of the emotion state.

According to an aspect of another exemplary embodiment, an information providing device includes a controller configured to obtain via a communication terminal, speech information provided by at least one participant in a communication conducted using the communication terminal, obtain state information indicating a current state of the at least one participant by using at least one from among the speech information and data stored in advance, and determines a virtual speech to be provided to the at least one participant based on the speech information and the state information; and an outputter configured to output the determined virtual speech.

Furthermore, the outputter is further configured to output an inquiring virtual speech for obtaining information related to the at least one participant, and the controller is further configured to obtain the speech information including additional speech information obtained in response to the inquiring virtual speech that was output.

Furthermore, the state information according to an exemplary embodiment may include at least one from among emotion information indicating a current emotion state of at least one participant, personal information related to the at least one participant, topic information related to a topic of the conversation, schedule information related to the at least one participant, and personality information related to the at least one participant.

Furthermore, the speech information may include voice information related to the at least one participant obtained by the communication terminal.

The controller may obtain content of the virtual speech by using the speech information, determines an expression style of the virtual speech by using the state information, and obtains the virtual speech in which the obtained content is expressed in the determined expression style.

The controller may determine whether the speech information includes a pre-set keyword and, upon a condition that the speech information includes the pre-set keyword, obtains the virtual speech including content related to a topic different from a current topic of the conversation.

The state information may include emotion information related to the at least one participant, and the controller may obtain the virtual speech corresponding to content and an expression style determined based on the emotion information.

According to an aspect of another exemplary embodiment, an information providing communication terminal includes a controller configured to obtain speech information provided by at least one participant in a communication conducted by using the communication terminal, obtains state information indicating a current state of the at least one participant by using at least one from among the speech information and data stored in advance, and determines a virtual speech to be provided to the at least one participant based on the speech information and the state information; and an outputter configured to output the determined virtual speech.

According to an aspect of another exemplary embodiment, an information providing server includes a controller configured to obtain speech information provided by at least one participant in a communication conducted using a communication terminal, obtain state information indicating a current state of the at least one participant by using at least one from among the speech information and data stored in advance, and determine a virtual speech to be provided to the at least one participant based on the speech information and the state information; and an outputter configured to output the determined virtual speech.

According to an aspect of another exemplary embodiment, there is provided a non-transitory computer readable recording medium having recorded thereon a computer program for implementing the method according to an exemplary embodiment.

Also, according to an exemplary embodiment, a virtual character related to the virtual speech may be generated.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
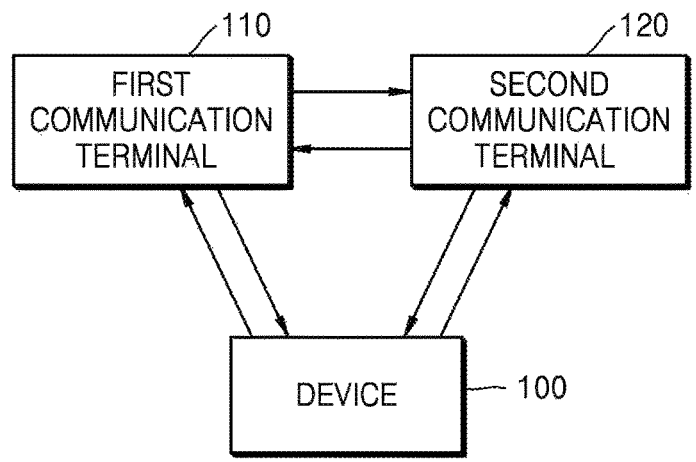
FIG. 1 is a diagram showing an example in which a device, according to an exemplary embodiment, provides information.

Reference will now be made in detail to embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, the present disclosure will be described more fully with reference to the accompanying drawings, in which exemplary embodiments of the present disclosure are shown. The present disclosure may, however, be embodied in many different forms and should not be construed as limited to the exemplary embodiments set forth herein. Rather, these exemplary embodiments are provided so that this disclosure will be thorough and complete, and will fully convey the scope of the present disclosure to one of ordinary skill in the art.

Terms used in the present specification will be briefly described, and then the present disclosure will be described in detail.

In addition, although the terms used in the present disclosure are selected from generally known and used terms, some of the terms mentioned in the description of the present disclosure have been selected by the applicant at his or her discretion, the detailed meanings of which are described in relevant parts of the description herein. Furthermore, it is required that the present disclosure is understood, not simply by the actual terms used but by the meaning of each term lying within.

In addition, unless explicitly described to the contrary, the word "comprise" and variations such as "comprises" or "comprising" will be understood to imply the inclusion of stated elements but not the exclusion of any other elements. In addition, the term "units" described in the specification mean units for processing at least one function and operation and can be implemented by software components or hardware components, such as FPGA or ASIC. However, the "units" are not limited to software components or hardware components. The "units" may be embodied on a recording medium and may be configured to operate one or more processors. Therefore, for example, the "units" may include components, such as software components, object-oriented software components, class components, and task components, processes, functions, properties, procedures, subroutines, program code segments, drivers, firmware, micro codes, circuits, data, databases, data structures, tables, arrays, and variables. Components and functions provided in the "units" may be combined to smaller numbers of components and "units" or may be further divided into larger numbers of components and "units."

Throughout the specification, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Hereinafter, an electronic device related to the present disclosure will be described in detail with respect to the attached drawings. The suffixes 'module' and 'unit' may be used for elements in order to facilitate the disclosure. Significant meanings or roles may not be given to the suffixes themselves and it is understood that the 'module' and 'unit' may be used together or interchangeably.

Reference throughout this specification to "one embodiment," "an embodiment," or similar language means that a particular feature, structure, or characteristic described in connection with the embodiment is included in at least one embodiment. Appearances of the phrases 'in some embodiments,' 'in certain embodiments,' 'in various embodiments,' and similar language throughout this specification may, but do not necessarily, all refer to the same embodiment, but mean 'one or more but not all embodiments' unless expressly specified otherwise.

FIG. 1 is a diagram showing an example in which a device 100, according to an exemplary embodiment, provides information.

A remote call may be performed between two people or among three people. For example, a remote call may be performed between two people by using a first communication terminal 110 and a second communication terminal 120. In another example, a remote call may be performed among three people by using the first communication terminal 110, the second communication terminal 120, and the device 100.

If a remote call is performed between two people, tension or inconvenience may be felt between the two individuals. However, if a remote call is performed among three people, tension or inconvenience between the call participants may be relatively eased. For example, according to an exemplary embodiment, if the device 100 participates in a remote call as a third participant while the remote call is being performed between two people via the first communication terminal 110 and the second communication terminal 120, the closed tit-for-tat mood of the remote call between two people may be eased. The third participant that participates in the remote call via the device 100 may be a virtual character. For example, a voice signal transmitted to the first communication terminal 110 or the second communication terminal 120 via the device 100 may be a virtual speech of a virtual character.

According to an exemplary embodiment, the device 100 may be embodied as a server separate from the first communication terminal 110 or the second communication terminal 120 and intervene in a communication between the first communication terminal 110 and the second communication terminal 120.

According to an exemplary embodiment, the device 100 may be arranged inside the first communication terminal 110 and intervene in a communication between the first communication terminal 110 and the second communication terminal 120.

According to an exemplary embodiment, the device 100 may be arranged inside the second communication terminal 120 and intervene in a communication between the first communication terminal 110 and the second communication terminal 120.

Figure 2:
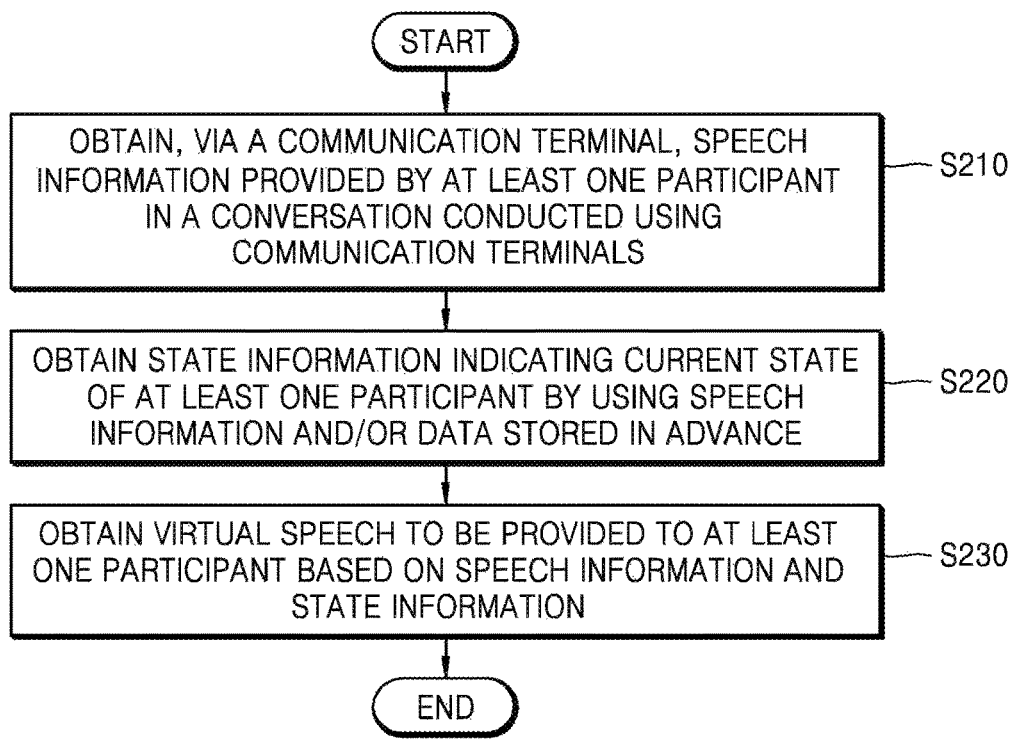
FIG. 2 is a flowchart showing a method by which the device, according to an exemplary embodiment, obtains a virtual speech.

FIG. 2 is a flowchart showing a method by which the device 100, according to an exemplary embodiment, obtains a virtual speech.

In operation S210, the device 100 according to an exemplary embodiment obtains speech information, which is provided by at least one participant in a conversation using a communication terminal, via the communication terminal.

Speech information according to an exemplary embodiment may include information obtained from voice signals. For example, the speech information may include information obtained from voice signals of a user of a communication terminal received via the communication terminal. In another example, the speech information may include keyword information obtained by analyzing voice signals of a user of a communication terminal. In another example, speech information may include voice information obtained by analyzing voice signals of a user of a communication terminal. In another example, speech information may include voice information regarding at least one participant, where the voice information obtained by a communication terminal.

The device 100 according to an embodiment may obtain speech information from one or more communication terminals. For example, the device 100 may obtain speech information from a first communication terminal and/or a second communication terminal.

A communication terminal according to an exemplary embodiment may include a microphone and a speaker. Furthermore, a communication terminal according to an exemplary embodiment may include a smart phone, a tablet computer, a personal digital device, a laptop computer, and a desktop computer, but is not limited thereto.

A communication terminal providing speech information to the device 100 according to an exemplary embodiment may perform a remote call function. A communication terminal according to an exemplary embodiment may include a local communication terminal or a remote communication terminal for a remote call. For example, a first communication terminal may be a local communication terminal, whereas a second communication terminal may be a remote communication terminal. The device 100 according to an exemplary embodiment may be embodied as a server, may be included in a communication terminal, or may be embodied as a separate device outside a communication terminal.

The device 100 according to an exemplary embodiment may analyze voice signals obtained via a communication terminal and obtain speech information.

Alternatively, a communication terminal according to an exemplary embodiment may obtain voice signals and transmit a result of analyzing the obtained voice signals to the device 100. The device 100 may obtain speech information by using the result of analyzing the voice signals received from the communication terminal.

A communication terminal or the device 100 may receive voice signals. For example, a user's voice signals may be received via a microphone of a communication terminal. For example, if voice signals of a user of a first communication terminal are received via a microphone of the first communication terminal, the device 100 may obtain the voice signals of the user of the first communication terminal via the first communication terminal. In another example, if voice signals of a user of a second communication terminal are received via a microphone of the second communication terminal, the device 100 may obtain the voice signals of the user of the second communication terminal via, or from, the second communication terminal. In another example, if voice signals of a user of a local communication terminal are received via a microphone of the local communication terminal, the device 100 may obtain the voice signals of the user of the local communication terminal via the local communication terminal. In another example, if voice signals of a user of a remote communication terminal are received via a microphone of the remote communication terminal, the device 100 may obtain the voice signals of the user of the remote communication terminal from the remote communication terminal.

Voice signals of a user input to a remote communication terminal may be transmitted to the device 100 or a local communication terminal via a wireless connection or a wire connection. Non-audio data (e.g., a score) may be edited based on keyboard inputs or button inputs or may be converted to audio data.

The wireless connections may include 2G/3G/4G connections, a Wi-Fi connection, a Bluetooth connection, a WiMAX connection, a Zigbee connection, an ultra wideband (UWB) connection, and any of other wireless connections that are currently developed or will be developed in the future, but are not limited thereto.

In operation S220, the device 100 according to an exemplary embodiment obtains state information indicating a current state of at least one participant by using the speech information and/or existing data stored in advance.

State information according to an exemplary embodiment may include at least one of emotion information indicating a current emotion state of at least one participant and/or a virtual character, personal information regarding at least one participant and/or a virtual character, topic information regarding a topic of conversation, schedule information regarding at least one participant, and personality information regarding at least one participant and/or a virtual character.

The emotion information according to an exemplary embodiment may include information regarding types of emotions and information regarding levels of emotions. The types of emotions may include elation, anger, sorrow, depression, and mildness, but are not limited thereto.

The device 100 according to an exemplary embodiment may obtain state information by using the speech information obtained in the operation S210.

For example, if a first communication terminal obtains a voice signal saying "I have a slight cold," the device 100 may obtain information regarding a current heath state of a user of the first communication terminal based on speech information obtained from the voice signal obtained by the first communication terminal. In another example, if a remote communication terminal obtains a voice signal saying "I fought with a friend of mine yesterday," the device 100 may receive the voice signal obtained by the remote communication terminal via a wireless connection and obtain state information indicating that a current user of the remote communication terminal may be in a bad emotional state.

The device 100 according to an exemplary embodiment may obtain state information by using existing data stored in advance.

For example, information regarding the age of a user may be obtained based on data regarding the date of birth of the user stored in advance. The existing data may be stored in the device 100, may be stored in a communication terminal, or may be stored in a server.

The device 100 according to an exemplary embodiment may obtain state information by using the speech information obtained in the operation S210 and existing data.

For example, if data regarding a user A and a user B is stored in advance, and the user A calls the user B father, the device 100 may obtain state information regarding the user A and the user B indicating that a relationship between the user A and the user B is a father-child relationship.

State information obtained according to an exemplary embodiment may be stored in a memory of a communication terminal, a memory of the device 100, or a server (not shown). For example, state information may be stored in a local communication terminal and/or a remote communication terminal. In another example, state information may be stored in an internal or external memory of the device 100 or a server connected to the device 100.

If state information is stored in a server, a communication terminal or the device 100 may obtain the state information from the server via a wire connection or a wireless connection.

In operation S230, the device 100 according to an exemplary embodiment obtains or determines a virtual speech to be provided to at least one participant based on speech information and/or state information. For example, the device 100 may determine one of a plurality of virtual speeches as a virtual speech to be provided to a participant or may generate a virtual speech to be provided to a participant.

A virtual speech according to an exemplary embodiment may be determined based on the speech information obtained in the operation S210 or the state information obtained in the operation S220.

According to an embodiment, the device 100 may provide a virtual speech via a virtual character. According to an exemplary embodiment, the device 100 may determine a virtual speech based on a gender, a personality, and a way of speaking of a virtual character.

The device 100 according to an exemplary embodiment may determine a personality and a way of speaking of a virtual character based on state information, and/or where the personality of the virtual character may be changed as state information is changed.

State information according to an exemplary embodiment may include personality variables and/or state variables. For example, state information according to an exemplary embodiment may be determined according to personality variables and/or state variables.

Personality variables may be used to express a general tendency of a virtual character corresponding to speech information input to a communication terminal and may be changed via a conversation between a user of the communication terminal and another person. For example, personality variables may include at least one of preferred/sensitive topics, preferred/sensitive keywords, sympathy, accents, adaptability, alertness, curiosity, defiance, eloquence, idiom usage, loquacity, peculiarities, responsiveness, sentimentality, and sleepiness, but are not limited thereto. For example, the preferred/sensitive topic may be used when the device 100 determines whether a virtual character will actively participate in a conversation regarding the corresponding topic or will barely participate therein. In another example, the preferred/sensitive keyword may be used when the device 100 determines whether the virtual character is interested in a particular topic (like sports) or is not interested in a particular topic (e.g., terrorism). In another example, the personality variable 'sympathy' may be used to determine whether the virtual character gives a positive comment or a negative comment regarding a person, an object, or a target. In another example, the personality variable accents may be used to indicate types and degrees of accents of the virtual character. In another example, the personality variable 'adaptability' may be used to indicate degree of a long term variation of the personality of the virtual character. In another example, the personality variable 'alertness' may be used to indicate how the virtual character is sensitive to input speech information. For example, the personality variable 'curiosity' may be used to express a questioning action of the virtual character. In another example, the personality variable 'defiance' may be used to express an action of the virtual character for carrying out an order. For example, the personality variable 'eloquence' may be used to indicate the virtual character's tendency of using eloquent and ornate sentences. In another example, the personality variable 'idiom usage' may be used to indicate phrases or sentences frequently used by the virtual character. In another example, the personality variable 'loquacity' may be used to indicate talkativeness of the virtual character. In another example, the personality variable 'peculiarities' may be used to indicate special reaction modes of the virtual character regarding particular topics. In another example, the personality variable 'responsiveness' may be used to indicate activeness of the virtual character regarding requests or inquiries. In another example, the personality variable 'sentimentality' may be used to indicate the virtual character's tendency of developing a strong emotion. In another example, the personality variable 'sleepiness' may be used to indicate the virtual character's tendency of exhibiting low responsiveness during the daytime.

State variables according to an exemplary embodiment may be used to determine behavioral characteristics of a virtual character. State variables may be determined based on previous state variables, speech information input via a communication terminal, personality variables, etc. For example, activeness may indicate how actively the virtual character talks about a topic or issue. High activeness may indicate that the virtual character frequently and voluntarily speaks at length. For example, an emotion state may indicate types (including elation and depression) and degrees of emotions that the virtual character expresses via a speech. In another example, a speech mechanism indicates the mechanism of a current speech of the virtual character. The speech mode may include adaptability and frequency regarding a particular dialect, degrees of formality and familiarity, and a request of a particular voice tone. In another example, spontaneity may indicate how active the virtual character starts a conversation.

In the operation S230, the device 100 according to an exemplary embodiment obtains or determines a virtual speech to be provided to at least one participant based on speech information and state information. For example, the device 100 may determine one of a plurality of virtual speeches as a virtual speech to be provided to a participant or may generate a virtual speech to be provided to a participant.

The device 100 according to an exemplary embodiment may generate a virtual speech having expression attributes corresponding to the speech information obtained in the operation S210 by using the state information obtained in the operation S220. Expression attributes of a virtual speech or expression attribute of speech information may be used to generate information related to expressions, such as a phrasing style and an emotion regarding a virtual speech, and may include information that may be used to indicate an emotion state and/or an expression mode.

Types of emotion states included in expression attributes according to an exemplary embodiment may include elation, anger, sorrow, depression, and mildness, but are not limited thereto. The types of emotion states may be defined by different levels, respectively. For example, emotion states of elation may include a plurality of levels, such as low, mid, and high. Expression modes according to an exemplary embodiment may include a phrasing style, an accent type, a dialect frequency, a dialect tone, a scene mode, and background music, but are not limited thereto.

According to an exemplary embodiment, the content of a virtual speech may be determined based on state information, and the content and/or expression attributes of speech information may be input to a communication terminal. For example, to obtain content, the device 100 according to an exemplary embodiment may analyze audio data input to a communication terminal by using an audio processing technique (e.g., a voice recognition technique) and may generate a virtual speech having content obtained from the analysis and expression attributes determined based on state information. In another example, the device 100 according to an exemplary embodiment may analyze speech information input to a communication terminal or obtained from a communication terminal to obtain expression attributes of speech information. Next, the device 100 according to an exemplary embodiment may generate a virtual speech having expression attributes determined based on analyzed speech information and state information.

For example, if speech information input to a communication terminal includes a topic 'football' and the topic 'football' is a preferred topic of a virtual character (according to an exemplary embodiment, a preferred topic may be defined based on personality variables included in state information regarding the virtual character), content related to the topic 'football' may be determined as the content of a virtual speech to be generated, where 'elation' may be determined as the type of the emotion state of expression attributes of the virtual speech to be generated.

In another example, if it is analyzed that an expression attribute of speech information input to a communication terminal belongs to the "sorrow"-type emotion state, the content of a virtual speech may be generated in relation to "consolation." In this case, "mildness" may be determined as the type of the emotion state from among expression attribute of the virtual speech to be generated.

According to an exemplary embodiment, if the content of speech information input to a communication terminal includes a keyword of a pre-set type, the content of a virtual speech may include prompt information corresponding to the pre-set type. For example, if the content of a communication includes an address-type keyword, the content of a virtual speech may include prompt information related to the address-type keyword, such as a quick address update or an address of a meeting place.

According to an exemplary embodiment, the content of a virtual speech may be determined based on expression attributes (like an emotion state) of speech information input to a communication terminal. Emotion states regarding a local user and a remote user may be analyzed and obtained at a communication terminal or the device 100, where the content of a virtual speech may be controlled according to the emotion states. For example, if an emotion stated of speech information is abnormal, the content of a virtual speech may include information regarding a topic different from a current topic or prompt information of a pre-set type. An abnormal emotion state may be determined based on a type and/or a duration of the abnormal emotion state. Types of emotion states may include positive types, such as elation, excitement, and joy, and may include negative types, such as sorrow, depression, anger, and terror, and neutral types, such as mildness. For example, a negative type emotion state may be determined as an abnormal emotion state. In another example, if a negative emotion state, such as sorrow and depression, continues for a pre-set time period (e.g., 1 minute) or longer, it may be determined that the emotion state is abnormal. In another example, if a positive emotion state, such as an interest and excitement, continues for a pre-set time period (e.g., 10 minutes) or longer, it may be determined that this emotion state is abnormal.

According to an exemplary embodiment, if a person mentioned in speech information input to a communication terminal is a participant of a current remote call (e.g., a local user or a remote user participating in the current remote call) or topics include a pre-set topic, the content of a virtual speech may include prompt information generated based on an emotion state of the speech information or information regarding a topic different from a current topic. According to an exemplary embodiment, the pre-set topic may be a topic that changes emotion states of participants or may be a topic that creates unpleasantness between participants. A topic may be stored in a database used for recording information regarding participants. For example, if speech information input to a communication terminal by a local user is related to a remote user of a current communication and the type of the emotion state of the speech information is anger, the content of a virtual speech may include prompt information for persuading the local user to control their emotion. For example, if the topic of the speech information of the local user includes a topic that triggers anger of the remote user (e.g., the age of the remote user), the content of the virtual speech may include a topic different from the topic mentioned in the speech information, such as weather and sports.

Expression attributes according to an exemplary embodiment may be obtained or generated by controlling previous expression attributes of a virtual speech. Since expression attributes of a virtual speech includes an emotion state and/or an emotion mode, the controlling of the previous expression attributes may include controlling of an emotion state and/or controlling of an expression mode.

The controlling of an emotion state according to an exemplary embodiment may include suppression of an emotion state and/or promotion of an emotion state. The suppression of an emotion state according to an exemplary embodiment may include controlling a positive type emotion state to change to a negative type emotion state and/or controlling a neutral type emotion state to change to a negative type emotion state, e.g., controlling an emotion state of elation to change to an emotion state of mildness or depression. According to an exemplary embodiment, the suppression of an emotion state may include controlling a high emotion state to change to a low emotion state, such as controlling high elation to change to mild elation. The development of an emotion state according to an exemplary embodiment may include controlling a negative type emotion state to change to a neutral or positive type emotion state and/or controlling a neutral type emotion state to change to a positive type emotion state, e.g., controlling an emotion state of mildness or depression to change to an emotion state of elation. According to an exemplary embodiment, the development of an emotion state may include controlling a low emotion state to change to a high emotion state, such as controlling mild elation to change to a high elation.

According to an exemplary embodiment, expression attributes of a virtual speech may be controlled based on the content of speech information input to a communication terminal. For example, if the content of speech information includes an interesting keyword pre-set to state information regarding a virtual character, an emotion state of the virtual speech may be developed. In another example, if the content of speech information includes a keyword of unpleasantness, where the content of speech information is pre-set to state information regarding the virtual character, a previous emotion state of the virtual speech may be suppressed. For example, if the content of speech information input to a communication terminal includes a positive sentence, the emotion state may be developed from the emotion state of the previous virtual speech. Here, the positive sentence may be a greeting or a sentence that may be used to return the greeting. If the content of speech information input to a communication terminal includes a greeting to a virtual character Min-soo, the emotion state of a virtual speech of the virtual character may be developed. In another example, if the content of the speech information includes an imperative sentence, the emotion state of a virtual speech of the virtual character may be suppressed. The imperative sentence may be a sentence used to make a request or give an order. If the content of speech information input to a communication terminal includes an imperative sentence structure, e.g., "Lower your voice, Min-soo," the emotion state of a virtual speech of the virtual character Min-soo may be suppressed.

According to an exemplary embodiment, an emotion state included in expression attributes of a virtual speech may be determined based on the state information obtained in the operation S220. For example, if the state information reflects 'sympathy' of a person who has input speech information, an emotion state may be controlled. As another example, if the state information reflects sympathy of the person who has input the speech information, an emotion state may be developed based on the setting of the state information. In another example, if the state information reflects sympathy of the person who has input the speech information or reflects sympathy of the person who has input the speech information on another person, an emotion state may be suppressed based on the setting of the state information.

If the content of speech information input to a communication terminal includes a pre-set interesting topic, the device 100 according to an exemplary embodiment may develop an emotion state. If the content of speech information input to a communication terminal includes a pre-set unpleasant topic, the device 100 according to an exemplary embodiment may suppress an emotion state.

An interesting topic and an unpleasant topic may each be determined based on personality variables constituting state information related to a virtual character. For example, the personality variables may include a variable for determining whether a topic is a preferred/sensitive topic. For example, a preference variable included in the personality variables may increase as a keyword related to a pre-set interesting topic is obtained from speech information and may decrease as a keyword related to a pre-set unpleasant topic is obtained from speech information. For example, a preference variable included in the personality variables may increase as a keyword related to art (a pre-set interesting topic) is obtained from speech information and may decrease as a keyword related to terrorism (a pre-set unpleasant topic) is obtained from speech information.

According to an exemplary embodiment, if a person mentioned in speech information input to a communication terminal is one of the participants of a current remote call, the device 100 according to an exemplary embodiment may develop the emotion state of a virtual character.

The device 100 according to an exemplary embodiment may determine state information by using an emotion state obtained from speech information input to a communication terminal. The device 100 may determine the emotion state of a virtual character by using the state information. For example, if an emotion state obtained from speech information input to a communication terminal is abnormal or an abnormal emotion state continued for a certain time period or longer, the device 100 may update current state information. An abnormal emotion state obtained from speech information may indicate a case where the emotion state of any one of the participants of a remote call is abnormal or a case where the emotion states of two or more participants of a remote call are abnormal.

The device 100 according to an exemplary embodiment may determine the emotion state of a participant in a remote call based on speech information input to a communication terminal by the participant. For example, if an emotion state obtained from speech information of a participant in a remote call is a negative type emotion state (e.g., anger type), the emotion state of the corresponding participant may be indicated as abnormal. In another example, if both emotion states obtained from the two participants in a remote call are negative types (e.g., the emotion state of a participant is anger type and the emotion state of the other participant is depression type), the emotion states of the corresponding participants may be indicated as bilaterally abnormal. In another example, if emotion states obtained from the two participants in a remote call are a positive type and a negative type (e.g., the emotion state of a participant is anger type and the emotion state of the other participant is elation type), the emotion states of the corresponding participants may be indicated as unilaterally abnormal or mutually abnormal.

The device 100 according to an exemplary embodiment may determine whether an emotion state is normal not only based on a type of emotion, but also based on the duration of a certain emotion. For example, it may be determined whether the emotion state of a corresponding participant is normal based on a type of emotion, an intensity of the emotion, and a duration of the emotion.

If it is determined that the emotion state(s) of one or more participants in a remote call is/are abnormal, the device 100 may obtain and output a virtual speech determined based on content and expression attributes for switching the emotion state(s) of the corresponding participant(s) to normal emotion state(s). Furthermore, the device 100 may determine whether the emotion state of a participant in a remote call is changed by a virtual speech provided by the device 100.

A virtual speech obtained and output by the device 100 according to an exemplary embodiment may be determined based on the content and expression attributes of the virtual speech. The expression attributes may include information related to an expression style of the virtual speech.

A phrasing style according to an exemplary embodiment may be determined based on expression attributes obtained from speech information input to a communication terminal. For example, if it is analyzed that a phrasing style obtained from speech information input to a communication terminal indicates a high frequency of a dialect usage in a region A, the expression attributes of a virtual speech provided by the device 100 may also include expression attributes regarding the dialect of the region A.

The device 100 may determine expression attributes of a virtual speech provided by the device 100 by determining one of a plurality of pre-set expression modes. For example, if a pre-set family mode is selected, the device 100 may obtain a virtual speech based on expression attributes related to a dialect used between family members and linguistic habits of the family members. In another example, the plurality of pre-set expression modes may also include a work mode and a relax mode other than the family mode, but are not limited thereto.

Figure 3:
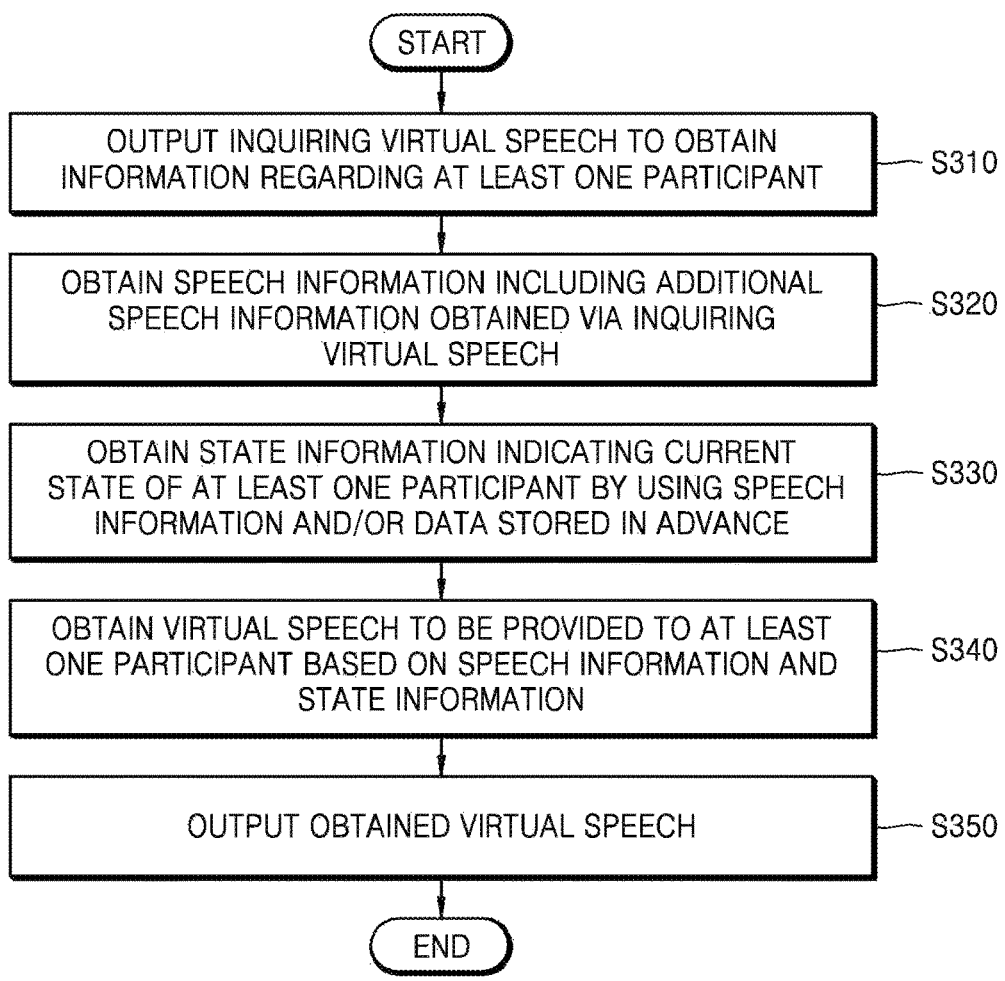
FIG. 3 is a flowchart showing a method by which the device obtains and outputs a virtual speech.

FIG. 3 is a flowchart showing a method by which the device 100 obtains and outputs a virtual speech.

Since operations S330 and S340 respectively correspond to the operations S220 and S230 described above with reference to FIG. 2, detailed descriptions thereof will be omitted for simplification of explanation.

In operation S310, the device 100 according to an exemplary embodiment outputs an inquiry virtual speech to obtain information regarding at least one participant.

For example, while a conversation is going on between a first participant and a second participant, the device 100 according to an exemplary embodiment may output a virtual speech for inquiring about today's schedules of the first participant. In another example, if a conversation regarding sports is going on between a first participant and a second participant, the device 100 according to an exemplary embodiment may output a virtual speech to the first participant inquiring about whether sports is an interesting topic for the first participant.

In operation S320, the device 100 according to an exemplary embodiment obtains speech information including additional speech information obtained via the inquiring virtual speech.

The device 100 according to an exemplary embodiment may obtain speech information provided by a participant in correspondence to the virtual speech output in the operation S310. The device 100 according to an exemplary embodiment may obtain addition speech information, which is speech information provided by a participant in correspondence to the virtual speech output in the operation S310. Furthermore, the device 100 according to an exemplary embodiment may obtain speech information including additional speech information via a communication terminal and obtain additional information by analyzing the additional speech information included in the speech information. The additional information may include information related to the participant, but is not limited thereto.

In operation S350, the device 100 according to an exemplary embodiment outputs a virtual speech obtained in the operation S340.

For example, the device 100 according to an exemplary embodiment may output the virtual speech obtained in the operation S340 in the form of voices. In another example, the device 100 according to an exemplary embodiment may output a virtual speech obtained in the operation S340 in the form of texts.

The device 100 according to an exemplary embodiment may provide the virtual speech obtained in the operation S340 only one of two participants in a remote call. Alternatively, the device 100 according to an exemplary embodiment may provide a virtual speech to both of the participants in a remote call. The device 100 according to an exemplary embodiment may output the virtual speech obtained in the operation S340 to one or a plurality of participants via a speaker, for example.

The output unit 930 ("outputter") according to an exemplary embodiment may generate a virtual speech corresponding to an expression style according to obtained state information and output the generated virtual speech via a communication terminal. For example, the virtual speech may be directly output by a speaker of a local communication terminal. After the virtual speech is encrypted, the virtual speech may be transmitted to a remote communication terminal via a telephone network and may be output by the remote communication terminal via a speaker of the remote communication terminal.

If i) the content of speech information input to a communication terminal includes a pre-set sensitive keyword regarding a virtual character, the device 100 according to an exemplary embodiment may delay outputting of speech information or ii) if an output command is received, the device 100 according to an exemplary embodiment may output speech information. The output command may be transmitted by the communication terminal or may be automatically transmitted by the communication terminal after a pre-set time interval. For example, if speech information input to a communication terminal during a communication includes a pre-set sensitive keyword (e.g., opposition) that may induce a quarrel, a virtual character of a local communication terminal may delay transmission of speech information to a remote communication terminal and may provide a virtual speech including a suggestion for changing a topic or controlling an emotion to a local user. While the transmission of the speech information is being delayed, the device 100 according to an exemplary embodiment may communicate with the local user or a remote user via a virtual speech in a private mode.

Figure 4:
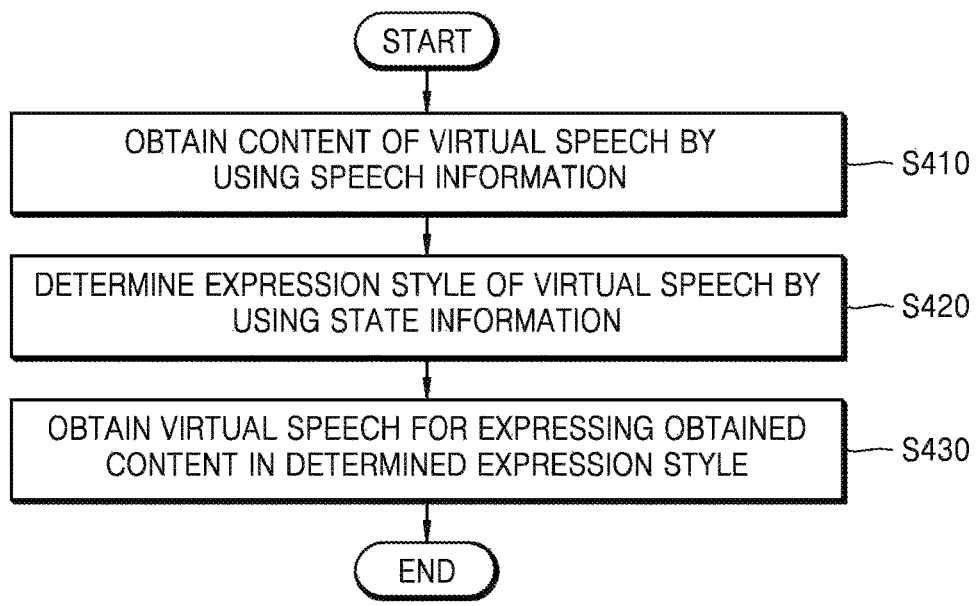
FIG. 4 is a flowchart showing a method by which the device, according to an exemplary embodiment, obtains a virtual speech by using speech information and state information.

FIG. 4 is a flowchart showing a method by which the device 100, according to an exemplary embodiment, obtains a virtual speech by using speech information and state information.

In operation S410, the device 100 according to an exemplary embodiment obtains the content of a virtual speech by using speech information.

The device 100 according to an exemplary embodiment may determine a topic by analyzing speech information obtained from a communication terminal and obtain content corresponding to the determined topic and a circumstance. For example, if there are two participants in a remote call about a topic related to the football, the device 100 according to an exemplary embodiment may determine content related to recent football news articles as the content of a virtual speech.

In operation S420, the device 100 according to an exemplary embodiment determines an expression style of the virtual speech by using state information.

An expression style according to an exemplary embodiment may refer to a style for phrasing a virtual speech in voices, such as a voice tone or a speaking speed. An expression style according to an exemplary embodiment may be determined based on expression attributes.

Expression attributes include a phrasing style, an emotion state of a virtual character, and an expression mode and may be determined based on state information. For example, the device 100 according to an exemplary embodiment may determine expression attributes corresponding to state information and determine an expression style according to the determined expression attributes.

For example, if it is determined based on state information that emotion states of participants in a remote call are too excited, the device 100 may determine an expression style of a virtual speech to express the content of the virtual speech in a soft and slow tone.

In operation S430, the device 100 according to an embodiment obtains a virtual speech in which the content obtained in the operation S410 is expressed in the expression style determined in the operation S420.

For example, the device 100 according to an exemplary embodiment may obtain a virtual speech for expressing the content related to a recent football news article as determined in the operation S410 in the expression style determined in the operation S420.

Figure 5:
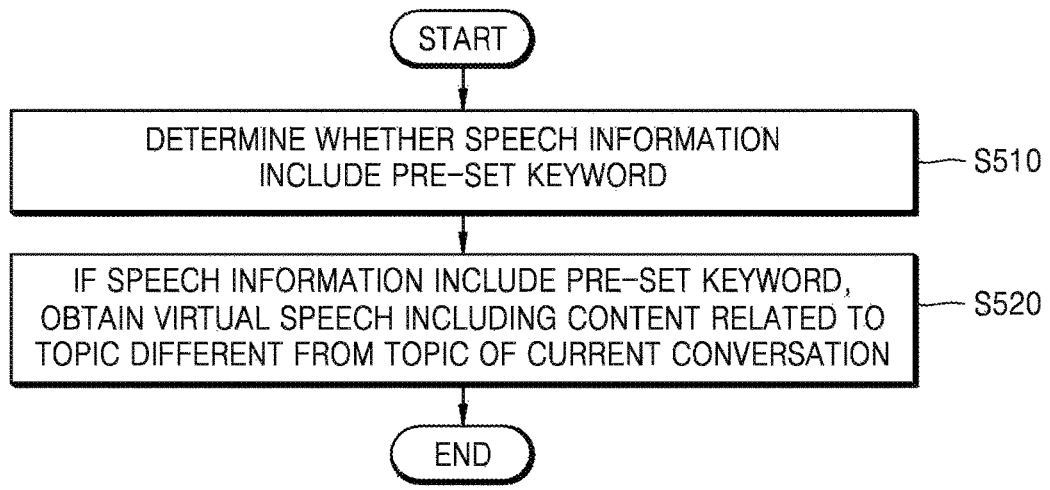
FIG. 5 is a flowchart showing a method by which the device, according to an exemplary embodiment, obtains a virtual speech based on whether speech information includes a pre-set keyword.

FIG. 5 is a flowchart showing a method by which the device 100, according to an exemplary embodiment, obtains a virtual speech based on whether speech information includes a pre-set keyword.

In operation S510, the device 100 according to an exemplary embodiment determines whether speech information includes a pre-set keyword.

For example, the device 100 according to an exemplary embodiment may determine whether speech information obtained via a communication terminal includes a keyword related to a topic not welcomed by participants of a remote call. In another example, the device 100 according to an exemplary embodiment may determine whether speech information obtained via a communication terminal includes a keyword related to a topic preferred by participants of a remote call.

In operation S520, if speech information includes a pre-set keyword, the device 100 according to an exemplary embodiment obtains a virtual speech including content related to a topic different from the topic of a current conversation.

For example, if speech information obtained by the device 100 according to an exemplary embodiment via a communication terminal includes a keyword related to a topic not welcomed by participants of a remote call, a virtual speech including content related to a topic irrelevant to a current topic may be obtained and output.

Figure 6:
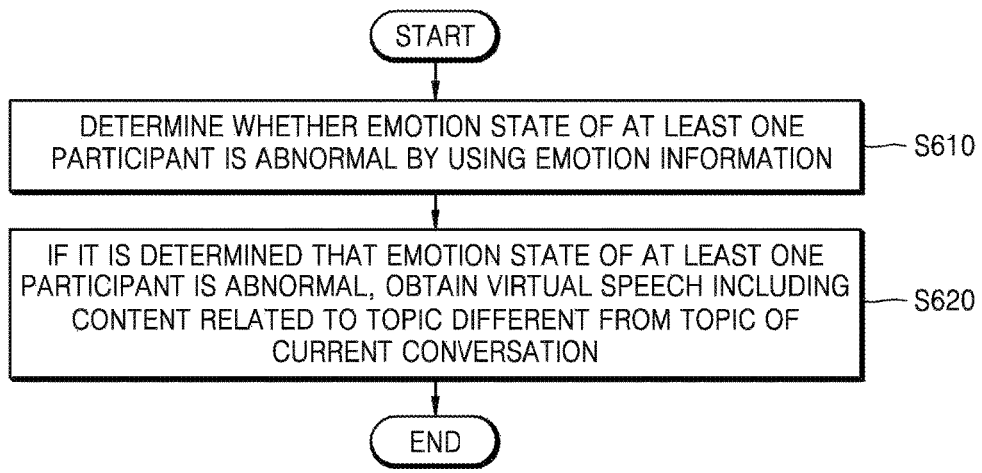
FIG. 6 is a flowchart showing a method by which the device, according to an exemplary embodiment, obtains a virtual speech based on emotion information.

FIG. 6 is a flowchart showing a method by which the device 100, according to an exemplary embodiment, obtains a virtual speech based on emotion information.

In operation S610, the device 100 according to an exemplary embodiment determines whether an emotion state of at least one participant is abnormal based on emotion information.

The emotion information according to an exemplary embodiment may include information related to types of emotions and information regarding levels of emotions. The types of emotions may include elation, anger, sorrow, depression, and mildness, but are not limited thereto.

For example, emotion information may include information indicating that the emotion state of a participant is anger and information related to a level of the anger. The device 100 according to an exemplary embodiment may obtain emotion information from speech information obtained via a communication terminal. The device 100 according to an exemplary embodiment may determine a level of an emotion state from among a plurality of emotion states based on speech information obtained via a communication terminal.

In operation S620, if it is determined that an emotion state is abnormal, the device 100 according to an exemplary embodiment obtains a virtual speech including content related to a topic different from the topic of a current conversation.

For example, if it is determined that a participant is maintaining a certain emotion state for a certain time period or longer, the device 100 according to an exemplary embodiment may determine that the emotion state of the participant is abnormal. Furthermore, if it is determined that the emotion state of a participant in a remote call is abnormal, the device 100 according to an exemplary embodiment may obtain a virtual speech including content related to a topic different from the topic of a current conversation. For example, if it is determined that anger of a participant is maintained for 1 minute or longer, the device 100 according to an exemplary embodiment may obtain and output a virtual speech including a topic related to sports, which is different from the topic of a current conversation.

Figure 7:
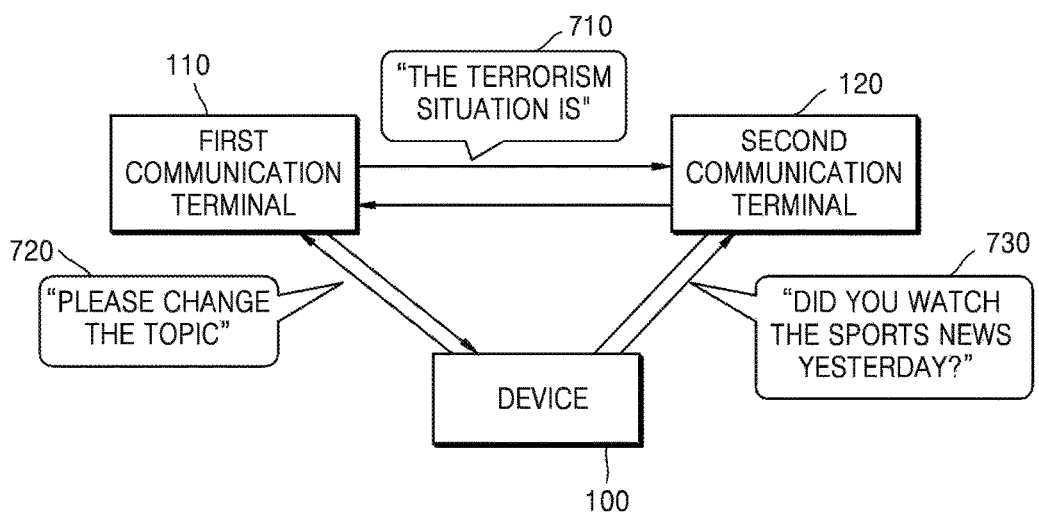
FIG. 7 is a diagram showing an example in which the device, according to an exemplary embodiment, obtains a virtual speech by using a keyword included in speech information.

FIG. 7 is a diagram showing an example in which the device 100, according to an exemplary embodiment, obtains a virtual speech by using a keyword included in speech information.

According to an exemplary embodiment, if the content of speech information input to a communication terminal includes a pre-set sensitive keyword in state information regarding a virtual character, the content of a virtual speech may include prompt information or topic information different from a current topic. A pre-set sensitive keyword according to an exemplary embodiment may be stored in a sensitive keyword field of personality variables of state information. If the content of a remote call according to an exemplary embodiment is related to a pre-set sensitive keyword, the pre-set sensitive keyword may negatively affect the remote call. For example, if the content of speech information includes a keyword 'terrorism' and the keyword 'terrorism' is one of the sensitive keywords in the state information related to a virtual character, the content of a virtual speech to be generated may include pre-set prompt information for requesting "Please change the topic" or may include topic information related to a topic different from a current topic, e.g., a "sports" topic.

For example, if speech information transmitted from the first communication terminal 110 to the second communication terminal 120 includes the content "The terrorism situation is" 710, the device 100 according to an exemplary embodiment may output a virtual speech including the content "Please change the topic" 720 to the first communication terminal 110 and/or the second communication terminal 120.

In another example, if speech information transmitted from the first communication terminal 110 to the second communication terminal 120 includes the content "The terrorism situation is" 710, the device 100 according to an exemplary embodiment may output a virtual speech including the content "Did you watch the sports news yesterday?" 730 to the first communication terminal 110 and/or the second communication terminal 120.

Figure 8:
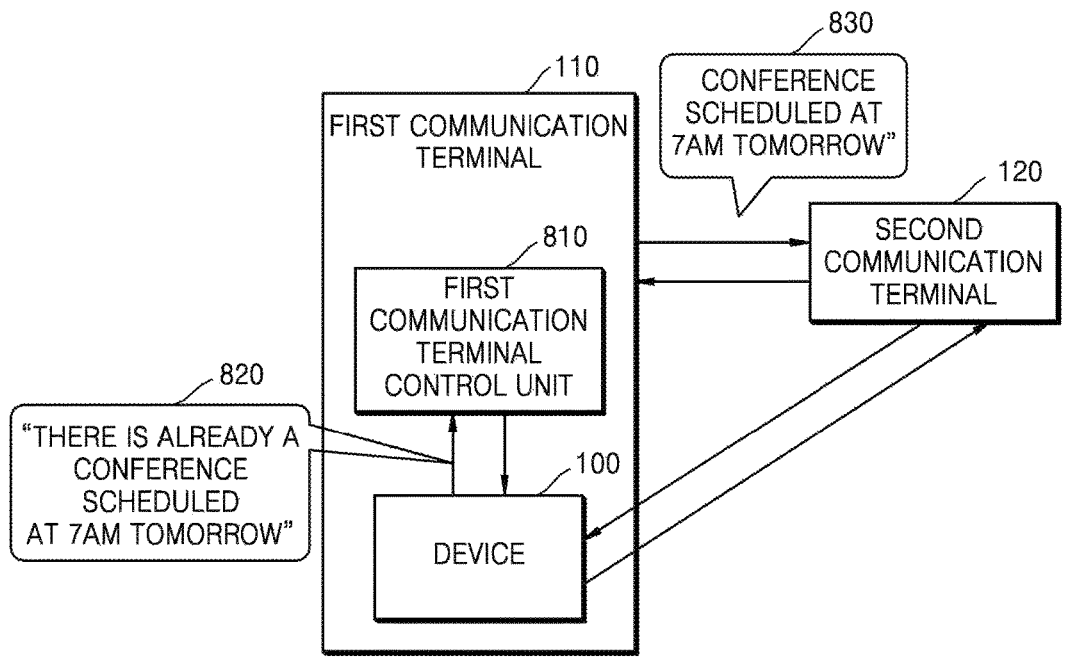
FIG. 8 is a diagram showing an example in which the device, according to an exemplary embodiment, obtains a virtual speech by using a keyword included in speech information.

FIG. 8 is a diagram showing an example that the device 100 according to an exemplary embodiment obtains a virtual speech by using a keyword included in speech information.

According to an exemplary embodiment, pre-set type(s) of keywords may include a numeric type and/or a temporal type. If the content of speech information input to a communication terminal includes a numeric type keyword, the content of a virtual speech may include prompt information related to updating of a contact list and numeric conversion. Furthermore, if the content of speech information includes a temporal type keyword, the content of a virtual speech may include prompt information related to a schedule conflict, a time reminder, a time difference with respect to a time reminder, or a travel reminder. For example, if the content of speech information includes a keyword "7:00 AM tomorrow," a communication terminal may search for information related to a user's schedule corresponding to 7:00 AM a day after. If a conflict is detected, the content of a generated virtual speech may include prompt information indicating that there is a schedule conflict.

For example, if speech information transmitted from the first communication terminal 110 to the second communication terminal 120 includes content "Conference scheduled at 7 AM tomorrow" 830, the device 100 according to an exemplary embodiment analyzes the schedule of a user of the first communication terminal 110 and, based on a result of the analysis, may transmit a virtual speech including content "There is already a conference scheduled at 7 AM tomorrow" 820 to a first communication terminal control unit 810.

The device 100 according to an exemplary embodiment may be located in the first communication terminal 110, may be located in the second communication terminal 120, or may be located outside the first communication terminal 110 and the second communication terminal 120.

Figure 9:
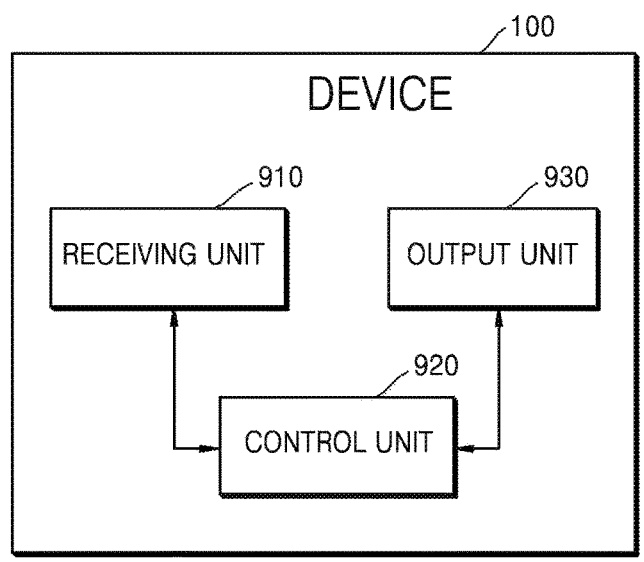
FIG. 9 is a block diagram showing a configuration of the device for providing information, according to an exemplary embodiment.

FIG. 9 is a block diagram showing the configuration of the device 100 for providing information according to an exemplary embodiment.

Referring to FIG. 9, the device 100 according to an exemplary embodiment includes a receiving unit 910, a control unit 920, and an output unit 930. FIG. 9 shows only the components of the device 100 related to the present exemplary embodiment. Therefore, one of ordinary skill in the art will understand that the device 100 may further include general-purpose components other than the components shown in FIG. 9.

The receiving unit 910 according to an exemplary embodiment obtains speech information, which is provided by at least one participant in a conversation using a communication terminal, via the communication terminal.

Speech information according to an exemplary embodiment may include information obtained from voice signals. For example, the speech information may include information obtained from voice signals of a user of a communication terminal received via the communication terminal. In another example, the speech information may include keyword information obtained by analyzing voice signals of a user of a communication terminal. In another example, speech information may include voice information obtained by analyzing voice signals of a user of a communication terminal.

The receiving unit 910 according to an exemplary embodiment may obtain speech information from one or more communication terminals. For example, the receiving unit 910 may obtain speech information from a first communication terminal and/or a second communication terminal.

A communication terminal according to an exemplary embodiment may include a microphone and a speaker. Furthermore, a communication terminal according to an exemplary embodiment may include a smart phone, a tablet computer, a personal digital device, a laptop computer, and a desktop computer, but is not limited thereto.

The control unit 920 according to an exemplary embodiment may analyze voice signals obtained via a communication terminal and obtain speech information. The control unit 920 according to an exemplary embodiment may include the receiving unit 910. For example, the control unit 920 may obtain speech information, which is provided by at least one participant a conversation using a communication terminal.

Alternatively, a communication terminal according to an exemplary embodiment may obtain voice signals and transmit a result of analyzing the obtained voice signals to the control unit 920. The control unit 920 may obtain speech information by using the result of analyzing the voice signals received from the communication terminal.

A communication terminal or the control unit 920 may receive voice signals. For example, a user's voice signals may be received via a microphone of a communication terminal. For example, if voice signals of a user of a first communication terminal are received via a microphone of the first communication terminal, the control unit 920 may obtain the voice signals of the user of the first communication terminal via the first communication terminal. In another example, if voice signals of a user of a second communication terminal are received via a microphone of the second communication terminal, the control unit 920 may obtain the voice signals of the user of the second communication terminal via the second communication terminal. In another example, if voice signals of a user of a local communication terminal are received via a microphone of the local communication terminal, the control unit 920 may obtain the voice signals of the user of the local communication terminal via the local communication terminal. In another example, if voice signals of a user of a remote communication terminal are received via a microphone of the remote communication terminal, the receiving unit 910 may obtain the voice signals of the user of the remote communication terminal via the remote communication terminal. The receiving unit 910 may be arranged inside the local communication terminal, may be arranged inside the remote communication terminal, or may be arranged outside the local communication terminal and the remote communication terminal.

The control unit 920 according to an exemplary embodiment obtains state information indicating a current state of at least one participant by using the speech information and/or existing data stored in advance.

State information according to an exemplary embodiment may include at least one of emotion information indicating a current emotion state of at least one participant, personal information regarding at least one participant, topic information regarding the topic of a conversation, schedule information regarding at least one participant, and personality information regarding at least one participant.

The emotion information according to an exemplary embodiment may include information regarding types of emotions and information regarding levels of emotions. The types of emotions may include elation, anger, sorrow, depression, and mildness, but are not limited thereto.

The control unit 920 according to an exemplary embodiment may obtain state information by using speech information.

For example, if a first communication terminal obtains a voice signal saying "I have a slight cold," the control unit 920 may obtain information regarding a current heath state of a user of the first communication terminal based on speech information obtained from the voice signal obtained by the first communication terminal. In another example, if a remote communication terminal obtains a voice signal saying "I fought with a friend of mine yesterday," the control unit 920 may receive the voice signal obtained by the remote communication terminal via a wireless connection and obtain state information indicating that a current user of the remote communication terminal may be in a bad emotional state.

The control unit 920 according to an exemplary embodiment may obtain state information by using existing data stored in advance.

For example, information regarding the age of a user may be obtained based on data related to the date of birth of the user stored in advance. The existing data may be stored in the control unit 920, may be stored in a communication terminal, or may be stored in a server.

The control unit 920 according to an exemplary embodiment may obtain state information by using the speech information obtained by the receiving unit 910 and existing data.

For example, if data regarding a user A and a user B is stored in advance, and the user A calls the user B father, the control unit 920 may obtain state information regarding the user A and the user B indicating that a relationship between the user A and the user B is a father-child relationship.

State information obtained according to an exemplary embodiment may be stored in a memory of a communication terminal, a memory of the control unit 920, or a server (not shown). For example, state information may be stored in a local communication terminal and/or a remote communication terminal. In another example, state information may be stored in an internal or external memory of the control unit 920 or a server connected to the control unit 920.

If state information is stored in a server, a communication terminal or the control unit 920 may obtain the state information from the server via a wire connection or a wireless connection.

The control unit 920 according to an exemplary embodiment obtains or determines a virtual speech to be provided to at least one participant based on speech information and/or state information. For example, the control unit 920 may determine one of a plurality of virtual speeches as a virtual speech to be provided to a participant or may generate a virtual speech to be provided to a participant.

A virtual speech according to an exemplary embodiment may be determined based on the speech information obtained by the receiving unit 910 and the state information obtained by the control unit 920.

According to an exemplary embodiment, the control unit 920 may provide a virtual speech via a virtual character. According to an exemplary embodiment, the control unit 920 may determine a virtual speech based on a gender, a personality, and a way of speaking of a virtual character.

The control unit 920 according to an exemplary embodiment may determine a personality and a way of speaking of a virtual character based on state information, where the personality of the virtual character may be changed as state information is changed.

State information according to an exemplary embodiment may include personality variables and/or state variables. For example, state information according to an exemplary embodiment may be determined according to personality variables and/or state variables.

Personality variables may be used to express a general tendency of a virtual character corresponding to speech information input to a communication terminal and may be changed via a conversation between a user of the communication terminal and another person. For example, personality variables may include at least one of preferred/sensitive topics, preferred/sensitive keywords, sympathy, accents, adaptability, alertness, curiosity, defiance, eloquence, idiom usage, loquacity, peculiarities, responsiveness, sentimentality, and sleepiness, but are not limited thereto. For example, the preferred/sensitive topic may be used when the device 100 determines whether a virtual character will actively participate in a conversation regarding the corresponding topic or will barely participate therein. In another example, the preferred/sensitive keyword may be used when the device 100 determines whether the virtual character is interested in a particular topic (like sports) or is not interested in a particular topic (e.g., terrorism). In another example, the personality variable 'sympathy' may be used to determine whether the virtual character gives a positive comment or a negative comment regarding a person, an object, or a target. In another example, the personality variable 'accents' may be used to indicate types and degrees of accents of the virtual character. In another example, the personality variable 'adaptability' may be used to indicate degree of a long term variation of the personality of the virtual character. In another example, the personality variable alertness may be used to indicate how the virtual character is sensitive to input speech information. For example, the personality variable 'curiosity' may be used to express a questioning action of the virtual character. In another example, the personality variable 'defiance' may be used to express an action of the virtual character for carrying out an order. For example, the personality variable 'eloquence' may be used to indicate the virtual character's tendency of using eloquent and ornate sentences. In another example, the personality variable 'idiom usage' may be used to indicate phrases or sentences frequently used by the virtual character. In another example, the personality variable 'loquacity' may be used to indicate talkativeness of the virtual character. In another example, the personality variable 'peculiarities' may be used to indicate special reaction modes of the virtual character regarding particular topics. In another example, the personality variable 'responsiveness' may be used to indicate activeness of the virtual character regarding requests or inquiries. In another example, the personality variable 'sentimentality' may be used to indicate the virtual character's tendency of developing a strong emotion. In another example, the personality variable sleepiness may be used to indicate the virtual character's tendency of exhibiting low responsiveness during the daytime.

State variables according to an exemplary embodiment may be used to determine behavioral characteristics of a virtual character. State variables may be determined based on previous state variables, speech information input via a communication terminal, personality variables, etc. For example, activeness may indicate how active the virtual character talks about a topic or issue. High activeness may indicate that the virtual character frequently and voluntarily speaks at length. For example, an emotion state may indicate types (including elation and depression) and degrees of emotions that the virtual character expresses via a speech. In another example, speech mechanism indicates the mechanism of a current speech of the virtual character. The speech mode may include adaptability and frequency related to a particular dialect, degrees of formality and familiarity, and a request of a particular voice tone. In another example, spontaneity may indicate how active the virtual character starts a conversation.

The output unit 930 according to an exemplary embodiment outputs a virtual speech obtained by the control unit 920.

For example, the output unit 930 according to an exemplary embodiment may output a virtual speech obtained by the control unit 920 in the form of voices. In another example, the output unit 930 according to an exemplary embodiment may output a virtual speech obtained by the control unit 920 in the form of texts.

The output unit 930 according to an exemplary embodiment may provide a virtual speech only to one of the two participants of a remote call. Alternatively, the output unit 930 according to an exemplary embodiment may provide a virtual speech to both of the two participants on a remote call. The output unit 930 according to an exemplary embodiment may output the virtual speech obtained by the control unit 920 to one or a plurality of participants via a speaker, for example.

The output unit 930 according to an exemplary embodiment may output a virtual speech corresponding to a phrasing style according to obtained state information. For example, a virtual speech may be directly output by a speaker of a local communication terminal. After a virtual speech is encrypted, the virtual speech may be transmitted to a remote communication terminal via a telephone network and may be output by the remote communication terminal via a speaker of the remote communication terminal.

Figure 10:
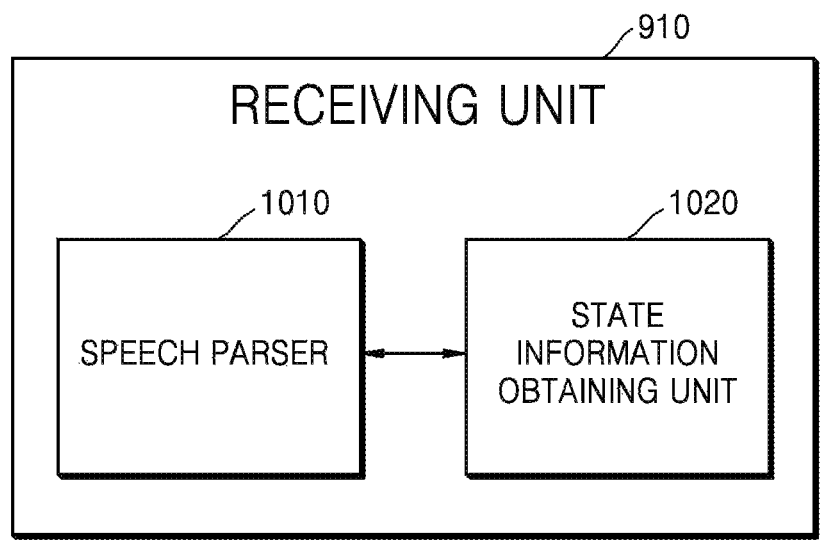
FIG. 10 is a block diagram showing a configuration of a receiving unit according to an exemplary embodiment.

FIG. 10 is a block diagram showing the configuration of the receiving unit 910 according to an exemplary embodiment.

Referring to FIG. 10, the receiving unit 910 according to an exemplary embodiment includes a speech parser 1010 and a state information obtaining unit 1020. FIG. 10 shows only the components of the receiving unit 910 related to the present exemplary embodiment. Therefore, one of ordinary skill in the art will understand that the receiving unit 910 may further include general-purpose components other than the components shown in FIG. 10.

The speech parser 1010 according to an exemplary embodiment may analyze voice signals input to the device 100 and extract speech information therefrom.

The state information obtaining unit 1020 may obtain or store state information.

The control unit 920 may generate a virtual speech including expression attributes according to speech information and state information. The output unit 930 may output a virtual speech. Speech information and a virtual speech may include expression attributes used for indicating non-content information, such as an emotion and a phrasing style of the virtual speech. Expression attributes may include an emotion state and/or an expression mode. Speech information may include other information, such as characteristics of a voice of a person input as an audio signal.

Types of emotion states included in expression attributes according to an exemplary embodiment may include elation, anger, sorrow, depression, and mildness, but are not limited thereto. Expression modes included in expression attributes may include a phrasing style, an accent type, a dialect frequency, a dialect tone, a scene mode, and background music, but are not limited thereto.

The speech parser 1010 according to an exemplary embodiment may analyze an audio signal input to a communication terminal and extract speech information therefrom. The extracted speech information may include content information (e.g., a topic, a keyword, etc.), expression mode information (e.g., an accent), and emotion state information (e.g., an emotion state of elation of a person inputting the audio signals), but is not limited thereto. Furthermore, the speech parser 1010 may include a speech recognizing module (not shown) for recognizing content information from an audio signal input to an electronic device and an expression attribute recognizing module (not shown) for recognizing expression attribute information from the audio signal.

The state information obtaining unit 1020 according to an exemplary embodiment may be used to store state information. State information may include information used to indicate a behavior and a personality of a virtual character. State information may be updated according to speech information obtained by the speech parser 1010, for example. A virtual character may participate in a remote call between participants of the remote call by using a virtual speech. Generation of a virtual speech of a virtual character according to an exemplary embodiment may be determined based on state information stored in the state information obtaining unit 1020.

According to an exemplary embodiment, state information may include personality variables and state variables. Personality variables may be used to identify a common disposition of a virtual character corresponding to speech information input to a communication terminal and may be changed based on a long-term communication between a user of the communication terminal and another person. For example, personality variables may include at least one of preferred/sensitive topics, preferred/sensitive keywords, sympathy, accents, adaptability, alertness, curiosity, defiance, eloquence, idioms, loquacity, peculiarities, responsiveness, sentimentality, and sleepiness, but are not limited thereto. State variables are used to indicate behavioral characteristics of a virtual character and may be changed based on previous state variables, speech information input to a communication terminal, and the above-stated personality variables. For example, state variables may include at least one of activeness, an emotion state, an expression mode, and spontaneity, but are not limited thereto. Personality variables and state variables may be set as default or may be obtained according to a command of a user. For example, a user of the device 100 may transmit a copy/update command to the device 100 to copy state information of a virtual character preferred by the user and update state information of the state information obtaining unit 1020 of the device 100.

The state information obtaining unit 1020 may update state information stored therein based on state information stored in the state information obtaining unit 1020 and speech information obtained by the speech parser 1010 under the control of the control unit 920. The control unit 920 may update state variables of state information based on at least one of speech information obtained by the speech parser 1010 or an update command from a user. Furthermore, the control unit 920 may update state variables of state information based on at least one of personality variables of the state information, speech information obtained by the speech parser 1010, and an update command from a user.

The control unit 920 according to an exemplary embodiment may update state variables according to an update command from a user. For example, as the control unit 920 receives a copy/update command from a user of a communication terminal, the control unit 920 may copy state variables of a virtual character preferred by the user and update state variables in the state information obtaining unit 1020. Furthermore, the control unit 920 may update state variables based on speech information obtained by the speech parser 1010. For example, the control unit 920 may analyze and compile statistics of content of apparatuses, determine idioms used in the content of the speech information at high frequencies, and update or enrich idioms in state variables.

The control unit 920 according to an exemplary embodiment may update state variables based on a relationship between personality variables and the state variables. For example, from among the personality variables, the personality variables: alertness, curiosity, a preferred topic, a preferred keyword, sympathy, loquacity, and responsiveness, may have positive effects on activeness of the state variables. For example, if alertness, curiosity, a preferred topic, a preferred keyword, sympathy, loquacity, and responsiveness are high or strong, activeness may be high. From among the state variables, sleepiness may have a negative effect on activeness. For example, activeness may be low during sleep time. Peculiarities of the personality variables may have a positive effect or a negative effect on activeness based on the circumstances.

The control unit 920 may update state variables based on speech information obtained by the speech parser 1010. For example, if a user inputting the speech information frequently communicate with a virtual character, activeness of the state variables may increase. If a user inputting the speech information barely communicates with a virtual character or focuses on other things, activeness of the state variables may decrease. Furthermore, personality variable data and state variables may be directly determined by a user. For example, activeness may be adjusted to a particular value based on an input of a user.

Figure 11:
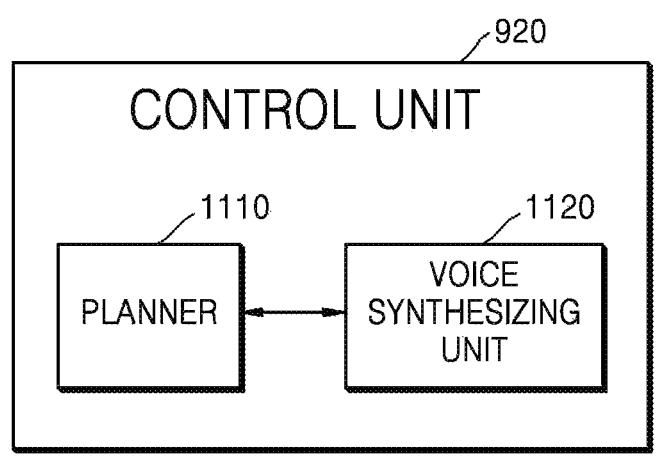
FIG. 11 is a block diagram showing a configuration of a control unit according to an exemplary embodiment.

FIG. 11 is a block diagram showing the configuration of the control unit 920 according to an exemplary embodiment.

Referring to FIG. 11, the control unit 920 according to an exemplary embodiment includes a planner 1110 and a voice synthesizing unit 1120. FIG. 11 shows only the components of the control unit 920 related to the present exemplary embodiment. Therefore, one of ordinary skill in the art will understand that the control unit 920 may further include general-purpose components other than the components shown in FIG. 11.

The control unit 920 according to an exemplary embodiment may include the planner 1110 and the voice synthesizing unit 1120. FIG. 11 is a schematic diagram showing the structure of the control unit 920 according to an exemplary embodiment. As shown in FIG. 11, the control unit 920 may include the planner 1110 and the voice synthesizing unit 1120. The planner 1110 may be used to i) determine expression attributes and content of a virtual speech to be generated based on state information stored in the state information obtaining unit 1020 and speech information obtained by the speech parser 1010, ii) generate a text descriptor based on content of a virtual speech, or iii) generate an expression attribute descriptor based on expression attributes. The voice synthesizing unit 1120 may generate a virtual speech based on a text descriptor and an expression attribute descriptor. The planner 1110 may i) analyze speech information obtained by the speech parser 1010, ii) recognize information, such as a person, a topic, a keyword, and a sentence structure, based on content of a virtual speech and expression attributes of pitch information, and iii) determine content of a virtual speech based on speech information.

The content of a virtual speech generated based on a determination of the planner 1110 according to an exemplary embodiment may include voluntary contents and mutual contents. Voluntary contents may include at least one of a greeting, a command to a user, an event reminder, a comment, or an inquiry, but are not limited thereto. Mutual contents may include a response with respect to at least one of a greeting, a command to a user, an event reminder, a comment, or an inquiry. For example, the identity of a user-input audio signal is recognized based on voice information of the speech information (e.g., the identity is recognized based on a user information database), the voluntary content of a virtual speech generated based on a determination of the planner 1110 may include a response to a greeting or a greeting to a user, where the greeting content may include the name of the user. If an interesting topic is detected in the speech information, mutual contents of a virtual speech generated based on a determination of the planner 1110 may include a comment regarding the topic.

Figure 12:
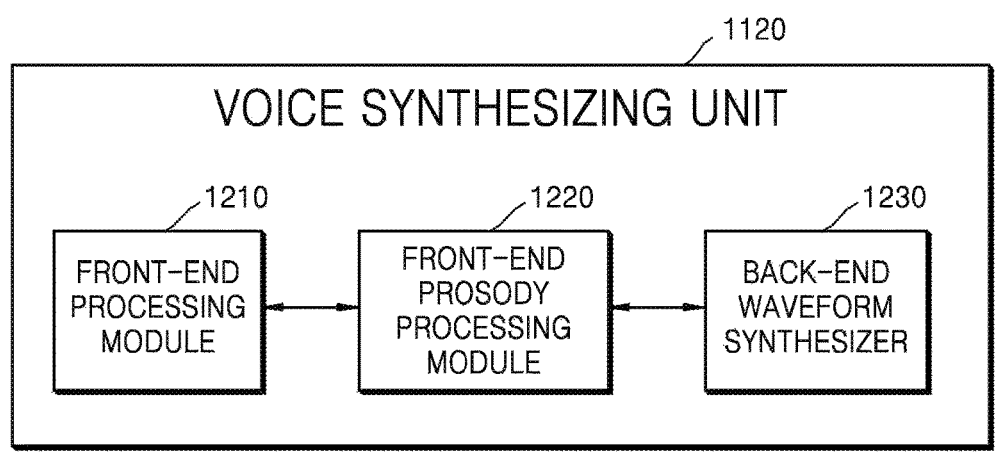
FIG. 12 is a block diagram showing a configuration of a voice synthesizing unit according to an exemplary embodiment.

FIG. 12 is a block diagram showing the configuration of the voice synthesizing unit 1120 according to an exemplary embodiment.

Referring to FIG. 12, the voice synthesizing unit 1120 according to an exemplary embodiment includes a front-end processing module 1210, a front-end prosody processing module 1220, and a back-end waveform synthesizer 1230. FIG. 12 shows only the components of the voice synthesizing unit 1120 related to the present exemplary embodiment. Therefore, one of ordinary skill in the art will understand that the voice synthesizing unit 1120 may further include general-purpose components other than the components shown in FIG. 12.

The voice synthesizing unit 1120 according to an exemplary embodiment may include i) the front-end processing module 1210 that generates a phonetic label according to a text descriptor, ii) the front-end prosody processing module 1220 for generating a prosody modulation descriptor according to an expression attribute descriptor, and iii) the back-end waveform synthesizer 1230 that generates a virtual speech according to a phonetic label and a prosody modulation descriptor. A phonetic label may be used to indicate characteristics of each unit of a virtual speech to be generated, such as an articulation and an intonation. A prosody modulation descriptor may be used to indicate characteristics including prosody modulations and rhythm emotion of words and sentences within a virtual speech.

According to an exemplary embodiment, the control unit 920 may determine an audio signal input to the device 100 or one of speeches in which an audio signal input to the device 100 overlaps virtual speeches as a virtual speech to be output. For example, the control unit 920 may select an audio signal input by a user of a communication terminal as an audio signal to be output. In this case, participants may feel that a virtual character is not participating in a conversation. In another example, the control unit 920 may select to output a speech in which an audio signal input to the device 100 overlaps a virtual speech. In this case, participants may feel that a virtual character is participating in a conversation.

Figure 13:
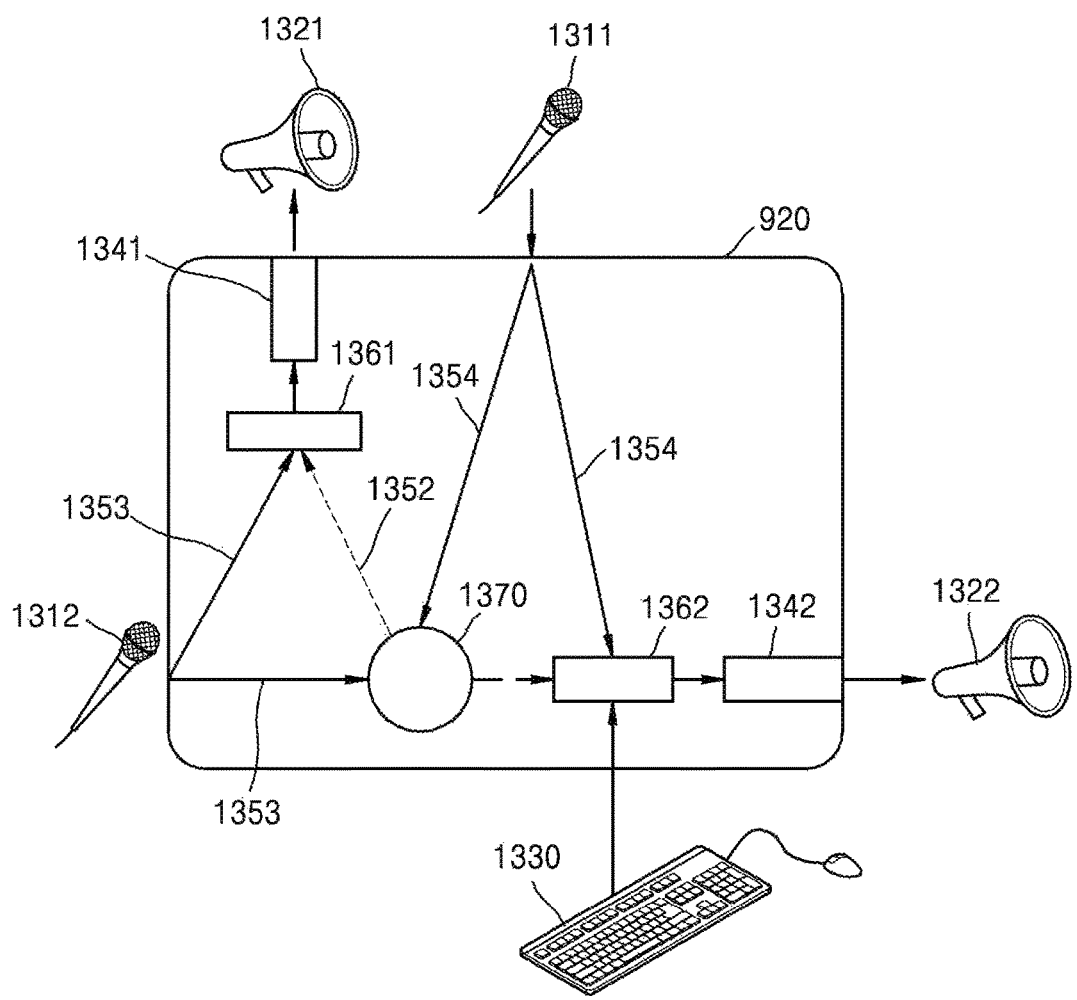
FIG. 13 is a block diagram showing a configuration of a control unit according to another exemplary embodiment.

FIG. 13 is a block diagram showing the configuration of the control unit 920 according to an embodiment.

FIG. 13 is a diagram showing the control unit 920 that controls the device 100 to output a virtual speech. As shown in FIG. 13, a first control unit 1362 may control the device 100 to overlap a virtual speech 1370 (like a virtual speech interacting with a local user) with an audio signal 1354, which is obtained via a component like a remote microphone 1311, via a local mixer 1342, to generate overlapped data and output the overlapped data to a local output unit 1322 (e.g., a speaker of the local user). A second control unit 1361 may control the device 100 to overlap a virtual speech 1352 (like a virtual speech interacting with a local user) with an audio signal 1353, which is input by the local user via a microphone 1312, via a remote mixer 1341, to generate overlapped data and output the overlapped data to a remote output unit 1321 (e.g., a speaker of a remote user). The second control unit 1361 may output the audio signal 1353 input by the local user as an output of the remote output unit 1321. The first control unit 1362 may output the audio signal 1354 input by a user of a remote terminal to the local output unit 1322. The control unit 920 may output the virtual speech 1370 to the local output unit 1322 or output the virtual speech 1370 to the remote output unit 1321. In the above-stated operations, the first control unit 1362 may receive a non-voice input from a user, such as a keyboard or mouse input 1330.

According to an exemplary embodiment, if the control unit 920 determines an audio signal input to the device 100 as an output, the control unit 920 may control the local output unit 1322 or the remote output unit 1321 to delay output of the audio signal. If an output command is received, the control unit 920 according to an exemplary embodiment may control the local output unit 1322 or the remote output unit 1321 to output a audio signal. The control unit 920 according to an exemplary embodiment may delay output of an audio signal input to the device 100 during a communication. While the output of the audio signal is being delayed, the control unit 920 may output a virtual speech to one or a plurality of participants of the communication in a private mode. The delayed output may cause cancellation of a sentence or a paragraph in the communication.

Figure 14:
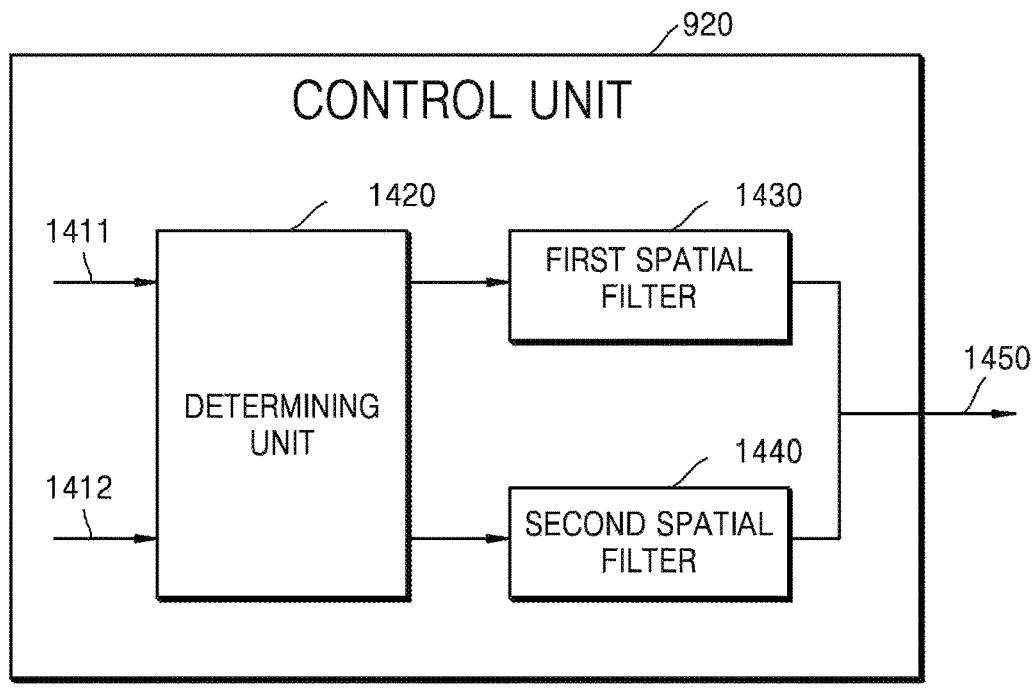
FIG. 14 is a block diagram showing a configuration of a control unit according to another exemplary embodiment.

FIG. 14 is a block diagram showing the configuration of the control unit 920 according to an exemplary embodiment.

Referring to FIG. 14, the control unit 920 according to an exemplary embodiment includes a determining unit 1420, a first spatial filter 1430, and a second spatial filter 1440. FIG. 14 shows only the components of the control unit 920 related to the present exemplary embodiment. Therefore, one of ordinary skill in the art will understand that the control unit 920 may further include general-purpose components other than the components shown in FIG. 14.

If the control unit 920 decides to overlap a virtual speech with an audio signal and output a result thereof, the device 100 according to an exemplary embodiment may be used to spatially filter the audio signal and the virtual speech. Furthermore, FIG. 14 shows that the control unit 920 filters an audio signal according to an embodiment. As shown in FIG. 14, the determining unit 1420 may select to output one or two audio signals 1411 and a virtual speech 1412 under the control of the control unit 920. If the control unit 920 decides to overlap a virtual speech with an audio signal and output a result thereof, the determining unit 1420 may simultaneously select the audio signal 1411 and the virtual speech 1412 to output the same and perform a spatial filtering (e.g., a pseudo-spatial filtering) thereto.

Figure 15:
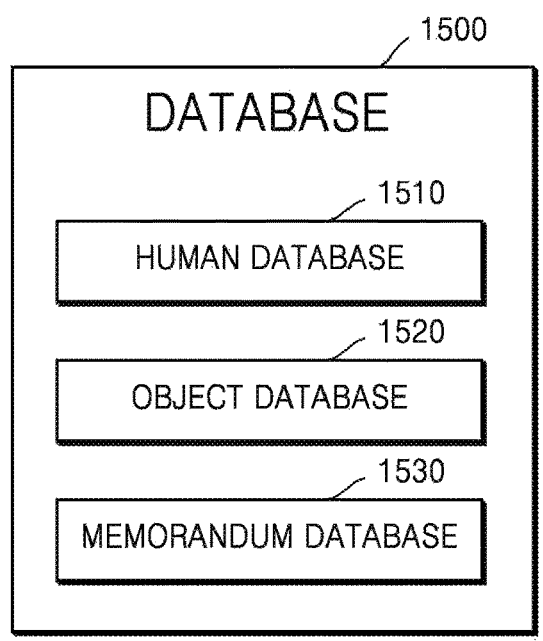
FIG. 15 is a block diagram showing a configuration of a database according to an exemplary embodiment.

FIG. 15 is a block diagram showing the configuration of a database 1500 according to an exemplary embodiment.

Referring to FIG. 15, the database 1500 according to an exemplary embodiment includes a human database 1510, an object database 1520, and a memorandum database 1530. FIG. 15 shows only the components of the database 1500 related to the present exemplary embodiment. Therefore, one of ordinary skill in the art will understand that the database 1500 may further include general-purpose components other than the components shown in FIG. 15.

According to an exemplary embodiment, the device 100 according to an exemplary embodiment may include a database for storing knowledge information. The knowledge information may be information indicating people and objects. Here, the control unit 920 may be used to generate a virtual speech having expression attributes based on i) speech information obtained by the speech parser 1010, ii) state information in the state information obtaining unit 1020, and iii) knowledge information stored in the database 1500. For example, speech information may include a topic stored in the database 1500, and the control unit 920 may generate a virtual speech for commenting in relation to the corresponding topic based on topic information and state information related to the topic stored in the database 1500.

FIG. 15 is a diagram showing the structure of the database 1500 according to an embodiment. As shown in FIG. 15, the database 1500 includes a human database 1510 for storing information regarding people, the object database 1520 for storing information regarding phonetic labels and common knowledge, and the memorandum database 1530 for storing information regarding topics, information regarding events, or information regarding objects.

Objects stored and recorded in the human database 1510 may include i) users of electronic devices, ii) users' contacts (e.g., contact information in contact lists), and iii) other connections (e.g., parents, coworkers, etc.). The human database 1510 may comprehensively store relevant data of the above-stated objects. The relevant data may include names, genders, and ages or people; information regarding social relationships for determining relevance between an object and another object; and information regarding social relationships and information regarding origins of human information for subsequent data management (e.g., data management for a certain time period after a communication), but is not limited thereto. Information of the human database 1510 may be obtained from a user input, an automatic contact list search, or an automatic online search.

Information stored in the object database 1520 according to an exemplary embodiment may include at least one of phonetic labels for the speech parser 1010 and common knowledge information for searching for knowledge. The information may include keywords (and synonyms thereof), commonly-known information (e.g., people and locations known in common and common words), phonetic labels, and origins of such words. The information of the object database 1520 may be originated from at least one of a user input, a public dictionary, and an automatic online search.

The memorandum database 1530 according to an exemplary embodiment may store non-common knowledge regarding non-human objects. Other than information regarding objects, information regarding events, and information regarding topics, the memorandum database 1530 may store information regarding origins of the above-stated information for subsequent data management. Information of the memorandum database 1530 may be obtained from a user input, a user calendar (log), and an analysis.

Figure 16:
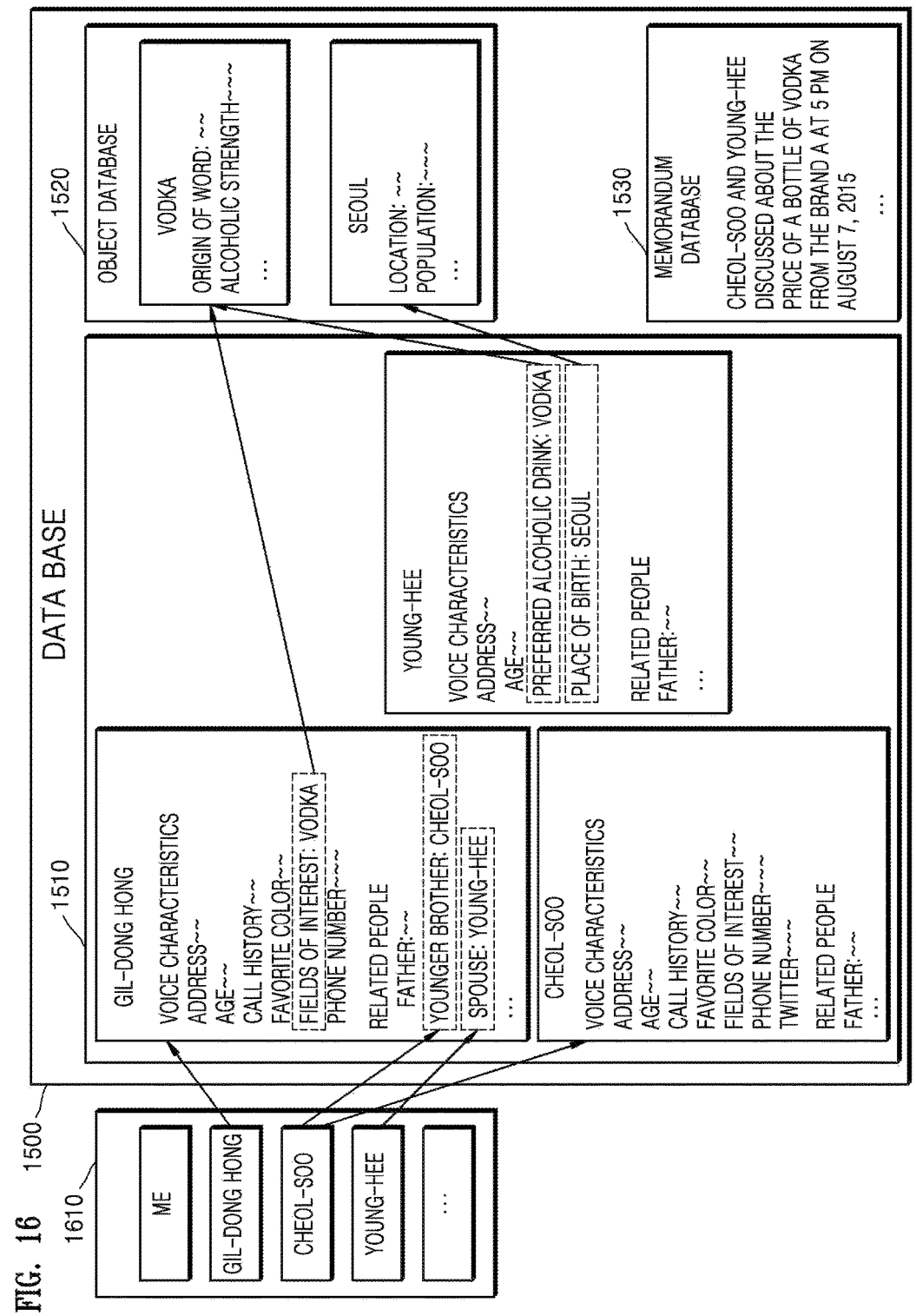
FIG. 16 is a block diagram showing a configuration of a database according to another exemplary embodiment.

FIG. 16 is a block diagram showing the configuration of the database 1500 according to an exemplary embodiment.

The database 1500 according to an exemplary embodiment may operate in conjunction with an external database 1610.

FIG. 16 shows relationships among the human database 1510, the object database 1520, and the memorandum database 1530 of the database 1500 according to an exemplary embodiment. As shown in FIG. 16, the human database 1510 stores data regarding a plurality of contacts in a user contact list stored in the external database 1610, such as names, voice characteristics, social relationships, ages, and phone numbers. Commonly-known knowledge data indicating some of data stored in the human database 1510 according to an exemplary embodiment may be stored in the object database 1520 according to an embodiment. For example, the object database 1520 according to an exemplary embodiment may include data indicating an item, e.g., a bottle of vodka purchased by a person named Gil-dong Hong. In FIG. 16, the memorandum database 1530 according to an exemplary embodiment may include information regarding an event (e.g., Young-hee and Cheol-soo discuss about the price of a bottle of vodka) and information regarding a topic (e.g., soccer in a previous communication). As shown in FIG. 16, if a remote participant of a remote call is Gil-dong Hong, the control unit 920 may generate a virtual speech for asking after a question related to Young-hee, the wife of Gil-dong Hong. A virtual speech generated according to an exemplary embodiment may include a topic related to vodka or Seoul in relation to Young-hee.

Information regarding a person stored in the human database 1510 according to an exemplary embodiment may include information regarding characteristics of speech/voice of the person. Furthermore, the device 100 may further include a speaker recognizer for identifying a person related to an audio signal input to the device 100 based on information regarding voice characteristics. For example, the device 100 according to an embodiment may identify a remote user by extracting information regarding characteristics of the voice of the remote user and searching for entries of voice characteristics matched to the extracted information stored in the human database 1510.

The device 100 according to an exemplary embodiment may further include a pattern matching unit (not shown) for extracting information from sentences matched to stored syntax patterns according to information stored in a dictionary database. Stored syntax patterns may include an interrogative sentence structure, a declarative sentence structure, and an imperative sentence structure, but are not limited thereto.

The control unit 920 according to an exemplary embodiment may be used to update knowledge information of the database 1500. Particularly, the control unit 920 may actively or passively update knowledge information based on at least one of an online search, an inquiry, an automatic intervention, a blank field filling, an uncertain field matching, and a new value discovery. For example, the control unit 920 may periodically search for uncertain fields or blank fields of the database 1500 based on speech information obtained via the device 100, may fill the uncertain fields or the blank fields by using a certain updating method, and update information stored in the database 1500. In another example, the control unit 920 may collect various knowledge information in the database 1500 by continuously monitoring keywords, major topics, and correctly-formed sentences in communications.

The control unit 920 according to an embodiment may perform data management regarding data of the database 1500 after a communication is terminated. For example, if an operation for matching voice characteristics of a remote user to voice characteristics stored in the human database 1510 is not completed during a communication, even after the communication is terminated, the control unit 920 may operate to match voice characteristics of the remote user to the voice characteristics of the human database 1510 until identification information regarding a person corresponding to the voice characteristics of the remote user or the voice characteristics of the remote user is compared to all information related to voice characteristics in the human database 1510.

Figure 17:
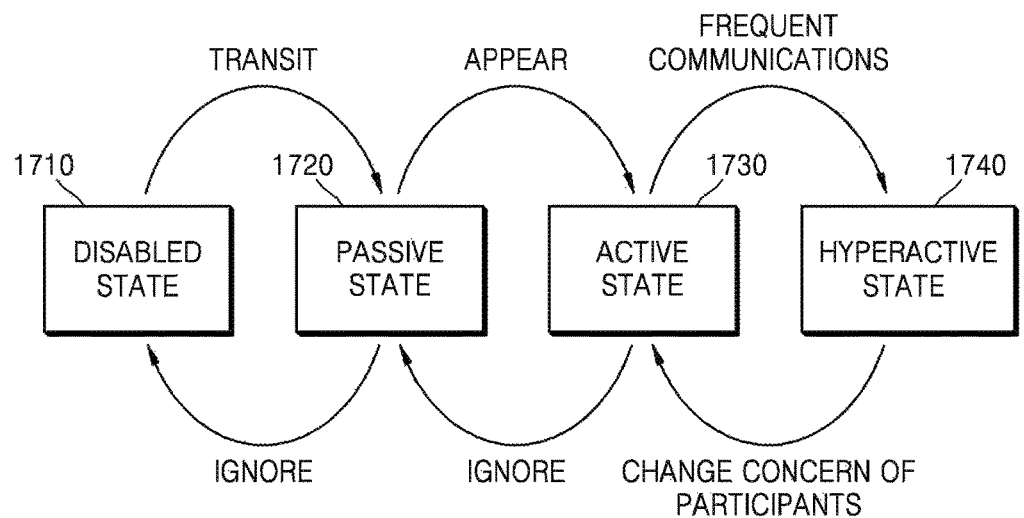
FIG. 17 is a diagram showing an example of emotion information according to an exemplary embodiment.

FIG. 17 is a diagram showing an example of emotion information according to an exemplary embodiment.

According to an embodiment, FIG. 17 shows the changing of a variable of state information related to activeness. If a virtual character is enabled, the activeness of state information may be changed from a disabled state 1710 (e.g., the activeness variable has a value corresponding to 0) to a passive state 1720 (e.g., the activeness variable has a value corresponding to 1). If a user initiates contact with the virtual character by saying a greeting to the virtual character, for example, the activeness of the virtual character may be changed to an active state 1730 (e.g., the activeness variable has a value corresponding to 2). If the user frequently communicates with the virtual character, the activeness of the virtual character may be changed to a hyperactive state 1740 (e.g., the activeness variable has a value corresponding to 3). If the concern of the user is changed, e.g., the user barely communicates with the virtual character, the activeness of the virtual character may be changed to the active state 1730. If the user keep ignoring the virtual character or directly gives an order like "Be quiet" to the virtual character, the activeness of the virtual character may be changed to the passive state 1720. If the user keep ignoring the virtual character or no longer communicates with the virtual character, the activeness of the virtual character may be changed to the disabled state 1710.

Figure 18:
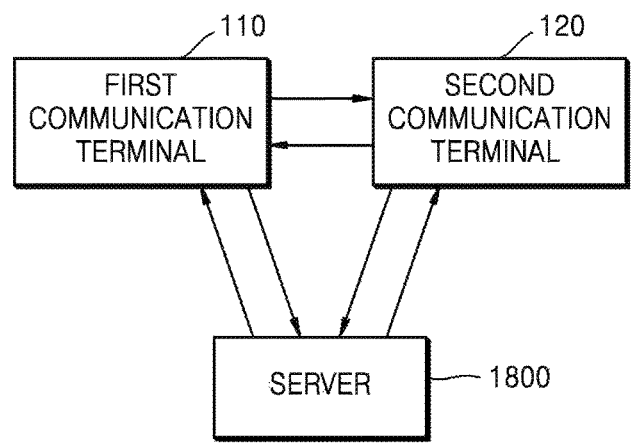
FIG. 18 is a diagram showing an example in which a server, according to an exemplary embodiment, provides information.

FIG. 18 is a diagram showing an example of a system in which the server 1800 according to an exemplary embodiment provides information.

The operations performed by the device 100 as described above with reference to FIGS. 1 to 17 may be embodied by the server 1800.

A remote call may be performed between two people or among three people. For example, a remote call may be performed between two people by using a first communication terminal 110 and a second communication terminal 120. In another example, a remote call may be performed among three people by using the first communication terminal 110, the second communication terminal 120, and the server 1800.

If a remote call is performed between two people, tension or inconvenience may occur. However, if a remote call is performed among three people, tension or inconvenience may be relatively eased. For example, according to an exemplary embodiment, if the server 1800 participates in a remote call as a third participant while the remote call is being performed between two people via the first communication terminal 110 and the second communication terminal 120, the closed and tit-for-tat mood of the remote call between two people may be eased. The third participant that participates in the remote call via the server 1800 may be a virtual character. For example, a voice signal transmitted to the first communication terminal 110 or the second communication terminal 120 via the server 1800 may be a virtual speech of a virtual character.

According to an embodiment, the server 1800 may be embodied as a server separate from the first communication terminal 110 or the second communication terminal 120 and intervene a communication between the first communication terminal 110 and the second communication terminal 120.

According to an exemplary embodiment, the server 1800 may be arranged inside the first communication terminal 110 and intervene a communication between the first communication terminal 110 and the second communication terminal 120.

According to an exemplary embodiment, the server 1800 may be arranged inside the second communication terminal 120 and intervene a communication between the first communication terminal 110 and the second communication terminal 120.

The server 1800 according to an exemplary embodiment may include the receiving unit 910, the control unit 920, and the output unit 930 as shown in FIG. 9.

The server 1800 according to an embodiment may obtain speech information, which is provided by at least one participant to a conversation, via the communication terminal.

Speech information according to an embodiment may include information obtained from voice signals. For example, the speech information may include information obtained from voice signals of a user of a communication terminal received via the communication terminal. In another example, the speech information may include keyword information obtained by analyzing voice signals of a user of a communication terminal. In another example, speech information may include voice information obtained by analyzing voice signals of a user of a communication terminal. In another example, speech information may include voice information related to at least one participant, obtained by a communication terminal.

The server 1800 according to an exemplary embodiment may obtain state information indicating a current state of at least one participant by using the speech information and/or existing data stored in advance.

State information according to an exemplary embodiment may include at least one of emotion information indicating a current emotion state of at least one participant and/or a virtual character, personal information related to at least one participant and/or a virtual character, topic information related to the topic of a conversation, schedule information related to at least one participant, and personality information related to at least one participant and/or a virtual character.

The server 1800 according to an exemplary embodiment may obtain or determine a virtual speech to be provided to at least one participant based on speech information and/or state information. For example, the server 1800 may determine one of a plurality of virtual speeches as a virtual speech to be provided to a participant or may generate a virtual speech to be provided to a participant.

The server 1800 according to an exemplary embodiment may output the obtained virtual speech.

For example, the server 1800 according to an exemplary embodiment may output an obtained virtual speech in the form of voices. In another example, the server 1800 according to an exemplary embodiment may output an obtained virtual speech in the form of texts.

The server 1800 according to an exemplary embodiment may provide an obtained virtual speech only to any one of two participants in a remote call. Alternatively, the server 1800 according to an exemplary embodiment may provide a virtual speech to both of the participants in a remote call. The server 1800 according to an exemplary embodiment may output an obtained virtual speech to one or a plurality of participants via a speaker, for example.

Figure 19:
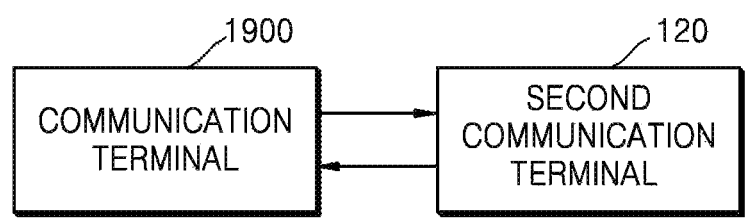
FIG. 19 is a diagram showing an example in which a communication terminal, according to an exemplary embodiment, provides information.

FIG. 19 is a diagram showing an example in which a communication terminal 1900 according to an exemplary embodiment provides information.

The operations performed by the device 100 as described above with reference to FIGS. 1 to 17 may be embodied by the communication terminal 1900.

For example, the communication terminal 1900 according to an exemplary embodiment may perform all of the functions of the first communication terminal 110 shown in FIG. 1, all of the functions of the device 100 as described above with reference to FIGS. 1 to 17, and all of the functions of the first communication terminal 110 as described above with reference to FIG. 8.

In another example, the communication terminal 1900 according to an exemplary embodiment may correspond to the first communication terminal 110 as described above with reference to FIG. 8.

The communication terminal 1900 according to an exemplary embodiment may include the receiving unit 910, the control unit 920, and the output unit 930 as shown in FIG. 9.

The communication terminal 1900 according to an exemplary embodiment may obtain speech information, which is provided by at least one participant to a conversation using a communication terminal, via the communication terminal.

Speech information according to an exemplary embodiment may include information obtained from voice signals. For example, the speech information may include information obtained from voice signals of a user of a communication terminal received via the communication terminal. In another example, the speech information may include keyword information obtained by analyzing voice signals of a user of a communication terminal. In another example, speech information may include voice information obtained by analyzing voice signals of a user of a communication terminal. In another example, speech information may include voice information related to at least one participant obtained by a communication terminal.

The communication terminal 1900 according to an exemplary embodiment may obtain state information indicating a current state of at least one participant by using the speech information and/or existing data stored in advance.

State information according to an exemplary embodiment may include at least one of emotion information indicating a current emotion state of at least one participant and/or a virtual character, personal information regarding at least one participant and/or a virtual character, topic information regarding the topic of a conversation, schedule information regarding at least one participant, and personality information regarding at least one participant and/or a virtual character.

The communication terminal 1900 according to an exemplary embodiment may obtain or determine a virtual speech to be provided to at least one participant based on speech information and/or state information. For example, the communication terminal 1900 may determine one of a plurality of virtual speeches as a virtual speech to be provided to a participant or may generate a virtual speech to be provided to a participant.

The communication terminal 1900 according to an exemplary embodiment may output an obtained virtual speech.

For example, the communication terminal 1900 according to an exemplary embodiment may output an obtained virtual speech in the form of voices. In another example, the communication terminal 1900 according to an exemplary embodiment may output an obtained virtual speech in the form of texts.

The communication terminal 1900 according to an exemplary embodiment may provide an obtained virtual speech only to any one of two participants in a remote call. Alternatively, the communication terminal 1900 according to an exemplary embodiment may provide a virtual speech to both participants in a remote call. The communication terminal 1900 according to an exemplary embodiment may output an obtained virtual speech to one or a plurality of participants via a speaker, for example.

One or more exemplary embodiments may be implemented by a computer-readable recording medium, such as a program module executed by a computer. The computer-readable recording medium may be an arbitrary available medium accessible by a computer, and examples thereof include all volatile media (e.g., RAM) and non-volatile media (e.g., ROM) and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. Hence, it will be understood that the exemplary embodiments described above are not limiting the scope of the present disclosure. For example, each component described in a single type may be executed in a distributed manner, and components described distributed may also be executed in an integrated form.

The scope of the present disclosure is indicated by the claims which will be described in the following rather than the detailed description of the exemplary embodiments, and it should be understood that the claims and all modifications or modified forms drawn from the concept of the claims are included in the scope of the present disclosure.

What is claimed is:

1. A method of providing information, the method comprising:
obtaining speech information provided by a first participant of two or more participants in a communication conducted using two or more communication terminals;
providing the speech information to a second participant of the participants; and
providing, based on the speech information, a virtual speech to the first participant or the second participant, the speech information being related to a first topic,
wherein the providing the virtual speech includes obtaining state information including emotion information on a current emotion state of the first participant and providing the virtual speech based on the emotion information in response to determining that the current emotion state of the first participant is different from a typical state of the first participant, and
wherein the virtual speech includes content related to a second topic which is different from the first topic.

2. The method of claim 1, wherein the obtaining of the speech information comprises:
outputting an inquiring virtual speech for obtaining information regarding at least one of the participants; and
obtaining the speech information including additional speech information obtained in response to the inquiring virtual speech that was output.

3. The method of claim 1,
wherein the state information further comprises at least one selected from schedule information related to at least one of the participants, personal information related to the at least one of the participants, topic information related to the first topic, and personality information related to the at least one of the participants.

4. The method of claim 1, wherein the speech information comprises voice information related to the first participant.

5. The method of claim 3, wherein content and expression style of the virtual speech are determined by the emotion information.

6. The method of claim 5, wherein the emotion information comprises information related to types of emotions and information related to levels of emotions.

7. A method of providing information, the method comprising:
obtaining speech information of a first topic provided by a first participant of two or more participants in a communication conducted using two or more communication terminals;
providing the speech information to a second participant of the participants; and
providing, based on the speech information, a first virtual speech and a second virtual speech to the first participant and the second participant respectively,
wherein the method further comprises obtaining emotion information indicating an emotion state of at least one of the participants by using the speech information,
wherein in response to determining that the emotion state of the at least one of the participants is different from a typical state of the at least one of the participants by using the emotion information,
the first virtual speech or the second virtual speech includes content related to a second topic which is different from the first topic.

8. The method of claim 7, wherein, whether the emotion state is different from the typical state is determined based on a type of the emotion state and a duration of the emotion state.

9. An information providing device comprising:
a memory storing instructions; and
at least one processor configured to execute the instructions to:
obtain speech information provided by a first participant of two or more participants in a communication conducted using two or more communication terminals;
provide the speech information to a second participant of the participants; and
provide, based on the speech information, a virtual speech to the first participant or the second participant, the speech information being related to a first topic,
wherein the at least one processor is further configured to execute the instructions to obtain state information including emotion information on a current emotion state of the first participant and to provide the virtual speech based on the emotion information in response to determining that the current emotion state of the first participant is different from a typical state of the first participant, and
wherein the virtual speech includes content related to a second topic which is different from the first topic.

10. The information providing device of claim 9, wherein the at least one processor is further configured to execute the instructions to:
output an inquiring virtual speech for obtaining information related to at least one of the participants, and
obtain the speech information including additional speech information obtained in response to the inquiring virtual speech that was output.

11. The information providing device of claim 9,
wherein the state information further comprises at least one selected from schedule information related to at least one of the participants, personal information related to the at least one of the participants, topic information related to the first topic, and personality information related to the at least one of the participants.

12. The information providing device of claim 9, wherein the speech information comprises voice information related to the first participant.

13. The information providing device of claim 11,
wherein content and expression style of the virtual speech are determined by the emotion information.

14. A communication terminal comprising:
a memory storing instructions; and
at least one processor configured to execute the instructions to:
obtain speech information provided by a first participant of two or more participants in a communication conducted using the communication terminal and another communication terminal;
transmit the speech information to a second participant of the participants; and
output a virtual speech based on the speech information, the speech information being related to a first topic,
wherein the at least one processor is further configured to execute the instructions to obtain state information including emotion information on a current emotion state of the first participant and to provide the virtual speech based on the emotion information in response to determining that the current emotion state of the first participant is different from a typical state of the first participant, and wherein the virtual speech includes content related to a second topic which is different from the first topic.

15. An information providing server comprising:

a memory for storing instructions; and at least one processor configured to execute the instructions to:

receive speech information provided by a first participant of two or more participants in a communication conducted using two or more communication terminals;

transmit the speech information to a second participant of the participants; and transmit, based on the speech information, a virtual speech to the first participant or the second participant, the speech information being related to a first topic, wherein the at least one processor is further configured to execute the instructions to obtain state information including emotion information on a current emotion state of the first participant and to provide the virtual speech based on the emotion information in response to determining that the current emotion state of the first participant is different from a typical state of the first participant, and wherein the virtual speech includes content related to a second topic which is different from the first topic.

16. A non-transitory computer readable recording medium having recorded thereon a computer program for implementing the method of claim 1.

17. The method of claim 1, wherein the speech information includes a keyword that is preset.

18. The information providing device of claim 9, wherein the at least one processor generates a virtual character related to the virtual speech.

19. The method of claim 1, wherein expression style of the virtual speech relates to a dialect of a particular region.

20. The information providing device of claim 9, wherein expression style of the virtual speech relates to a dialect of a particular region.

21. The method of claim 3, wherein the providing the virtual speech comprises:

obtaining content of the virtual speech by using the speech information;

determining an expression style of the virtual speech by using the state information; and obtaining or generating the virtual speech in which the obtained content is expressed in the determined expression style.

22. The information providing device of claim 11, wherein the at least one processor is further configured to execute the instructions to:

obtain content of the virtual speech by using the speech information;

determine an expression style of the virtual speech by using the state information; and obtain the virtual speech in which the obtained content is expressed in the determined expression style.

23. The method of claim 1, wherein the providing the virtual speech includes providing the virtual speech based on the emotion information in response to determining that the current emotion state of the first participant continues for a time period equal to or greater than a preset time period.

24. The information providing device of claim 9, wherein the at least one processor is further configured to execute the instructions to provide the virtual speech based on the emotion information in response to determining that the current emotion state of the first participant continues for a time period equal to or greater than a preset time period.

* * * * *